United States Patent
Hoole et al.

(10) Patent No.: US 11,201,839 B2
(45) Date of Patent: Dec. 14, 2021

(54) METHOD AND APPARATUS FOR TRANSPORTING DATA TRAFFIC USING CLASSIFICATIONS

(71) Applicant: Charter Communications Operating, LLC, St. Louis, MO (US)

(72) Inventors: Elliott Hoole, Parker, CO (US); Pratik Das, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 102 days.

(21) Appl. No.: 16/656,365

(22) Filed: Oct. 17, 2019

(65) Prior Publication Data
US 2021/0119941 A1    Apr. 22, 2021

(51) Int. Cl.
| | |
|---|---|
| *H04L 12/861* | (2013.01) |
| *H04W 40/12* | (2009.01) |
| *H04L 12/851* | (2013.01) |
| *H04W 28/02* | (2009.01) |
| *H04W 84/04* | (2009.01) |

(52) U.S. Cl.
CPC .......... *H04L 49/90* (2013.01); *H04L 47/2441* (2013.01); *H04W 28/0289* (2013.01); *H04W 40/12* (2013.01); *H04W 84/045* (2013.01)

(58) Field of Classification Search
CPC ............... H04L 49/90; H04L 47/2441; H04W 28/0289; H04W 40/12; H04W 84/045
See application file for complete search history.

(56) References Cited

U.S. PATENT DOCUMENTS

| | | | |
|---|---|---|---|
| 7,581,012 B2 | 8/2009 | Shiouchi | |
| 9,270,592 B1* | 2/2016 | Sites | H04L 45/745 |
| 2005/0063317 A1 | 3/2005 | Risber | |
| 2012/0275401 A1* | 11/2012 | Sun | H04W 72/042 370/329 |
| 2017/0034734 A1* | 2/2017 | Ahmadi | H04L 47/34 |
| 2017/0332282 A1* | 11/2017 | Dao | H04W 72/087 |
| 2019/0319858 A1 | 10/2019 | Das et al. | |
| 2020/0053018 A1* | 2/2020 | White | H04L 47/2441 |
| 2020/0267077 A1* | 8/2020 | Williams | H04L 47/2441 |

(Continued)

OTHER PUBLICATIONS

3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated Sep. 2017.

(Continued)

*Primary Examiner* — Shailendra Kumar
(74) *Attorney, Agent, or Firm* — Gazdzinski & Associates, PC

(57) ABSTRACT

Apparatus and methods for parsing data traffic into queues for efficient routing and prioritization. In one embodiment, methods and apparatus for backhauling small cell data traffic using existing cable network infrastructure using DOCSIS Low Latency queue capabilities are provided. A data traffic classifier may use a two-stages sorting algorithm, including a first stage classification using IP address information and a second stage classification using differentiated services code point (DSCP) value information. In one implementation, the DSCP values of the data traffic are set using QoS Flow Identification (QFI) values.

20 Claims, 17 Drawing Sheets

(56) References Cited

U.S. PATENT DOCUMENTS

2020/0374352 A1* 11/2020 Ge .................... H04W 76/11
2021/0092640 A1*  3/2021 Ravishankar ..... H04W 28/0967

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018.
DOCSIS 3.1, MAC and Upper Layer Protocols Interface Specification, Cable Labs, CM-SP-MULPIv3.1-I18-190422, Apr. 22, 2019 (957 pages).

* cited by examiner

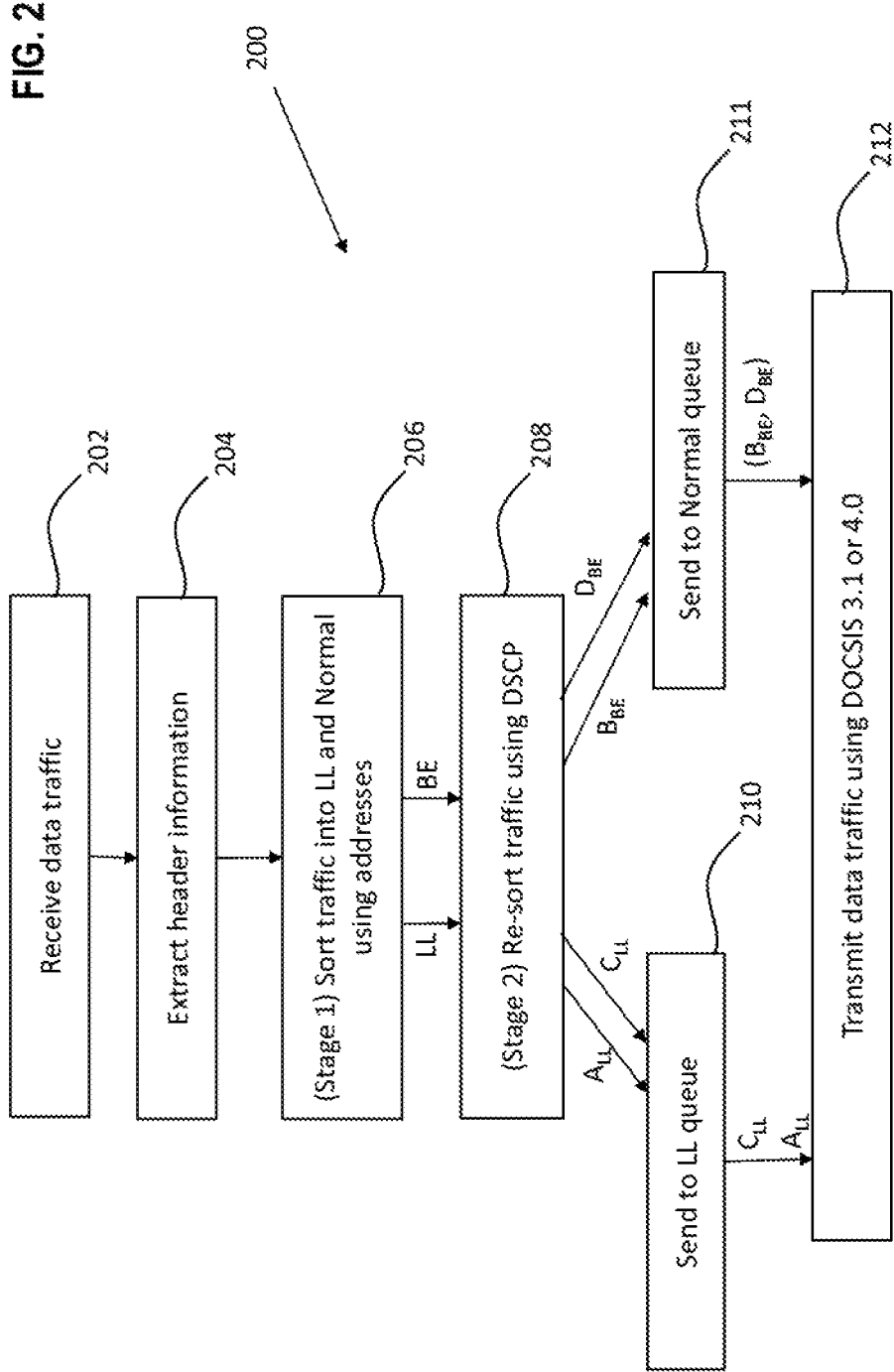

| Traffic Type | DSCP (1) |
|---|---|
| Network Synchronization | 54 |
| Routing, Network Control | 48 |
| QCI1 - GBR Conversational Voice | 46 |
| QCI2 - GBR Conversational Video (Live Streaming) | 36 |
| QCI3 - GBR Real Time Gaming | 34 |
| QCI4 - GBR Non-Conversational Video (Buffered Streaming) | 38 |
| QCI5 - IMS Signaling | 40 |
| QCI6 - Non-GBR TCP Specific Services | 26 |
| QCI7 - Non-GBR Voice/Video/Interactive Gaming | 10 |
| QCI8 - Non-GBR TCP Premium Bearer | 12 |
| QCI9 - Non-GBR TCP Default Bearer | 14 |
| Inter-eNB Carrier Aggregation GTP-U Traffic | 14 |
| S1AP/X2AP - Inter-Node Signaling | 40 |
| O&M Access (including O&M Bulk Data) | 16 |

FIG. 2E

METHOD AND APPARATUS FOR TRANSPORTING DATA TRAFFIC USING CLASSIFICATIONS

RELATED APPLICATIONS

This application is related to co-owned and co-pending U.S. patent application Ser. No. 16/384,701 (TWAR.256A/CHTR-2018-51) entitled "Apparatus and Methods for Enhancing Quality of Experience for Over-the-Top Data Services over High-Capacity Wireless Networks" filed on Apr. 15, 2019, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless or wireline interfaces, and specifically in one aspect, to apparatus and methods for parsing small cell traffic into low latency and normal queues.

2. Description of Related Technology

Current data communication services are provided using various combinations of wireless and wired network infrastructures. Data Over Cable Services Interface Specification (DOCSIS) is a telecommunication standard that allows the transport of data traffic (e.g., IP packets) over existing cable networks using Quadrature Amplitude Modulation (QAM) carriers or aggregations of carriers. DOCSIS may be used by a network operator such as a multiple systems operator (MSO) to, inter alia, transmit Internet Protocol data over existing hybrid fiber-coaxial (HFC) infrastructure (e.g., to provide broadband Internet access to a customer premises). In addition, DOCSIS cable backhaul is often used to service wireless nodes (access points, small cells, femtocells, CBSDs or FWA devices) in order to transport large amounts of small cell traffic data (e.g., 4G, 4.5G, or 5G traffic) using a cable distribution network (e.g., an HFC network).

In the current data communication environment, network users need to receive data communication services that require extremely large amounts of data transfer, without suffering a loss in the quality of service (QoS) or the quality of experience (QoE). For example, 5G NR is expected to provide very low-latency wireless communication (on the order of 1 ms or less "round trip").

The data communication over cable used to backhaul wireless/small cell traffic needs to be able to support certain bandwidth, quality, and latency requirements. Cable backhaul of small cell traffic may try to provide quality of service by, inter alia, making sure that traffic that requires lower latency (e.g., real-time gaming or virtual or augmented reality (VR or AR) applications) gets prioritized over other types of traffic. However, in legacy DOCSIS versions, all traffic ultimately has to pass through a single queue, and network congestion affects all services, including traffic requiring low latency.

Current DOCSIS versions (i.e., DOCSIS 3.1 or 4.0) specifically provide Low Latency traffic support, including providing a dual-queue mechanism for all traffic that can help mitigate queueing latency. The dual-queue has one deep buffer (with active queue management, AQM) for queue-building traffic, known as the "Classic Queue," and one short buffer (with AQM) for non-queue-building traffic, known as the "Low Latency Queue." This dual-queue architecture has a simple, native classifier and scheduling mechanism for balancing congestion across the top queues and assigning traffic to the appropriate queue. By default, the native classifier will (i) sort all traffic marked with DSCP-EF (differentiated services code point, expedited forwarding), traffic marked with other non-queue-building codepoints, and traffic with explicit congestion notification (ECN) set to 1 into the Low Latency Queue, and (ii) sort all other traffic into the Classic Service Flow. However, the native classifier is very "coarse" in terms of granularity; i.e., it is not capable of addressing concerns, requirements, and/or benefits that a specific vendor, carrier, or network operator (e.g., a cable or satellite multiple systems operator or MSO, or a mobile network operator or MNO) might otherwise consider or require.

Thus, improved methods and apparatus are needed to address the foregoing deficiencies. Ideally, a widely applicable and flexible mechanism for granularly parsing data traffic, based on for example prioritization and QoS requirements, in order to fully take advantage of DOCSIS Low Latency queue support, would be provided in such improved solutions. Further, 5G QoS support would ideally be provided, so as to, inter alia, improve the parsing of 5G NR data traffic.

Moreover, such improved apparatus and methods would ideally be compatible with "next generation" plant architectures such as (e.g., in the cable context) CCAP or Converged Cable Access Platform components and structures.

SUMMARY

The present disclosure meets at least the foregoing needs by providing, inter alia, methods and apparatus for parsing data traffic to support one or more requirements or functions, including prioritization of traffic according to latency.

In particular, some exemplary embodiments of the present disclosure provide support for backhauling small cell (e.g., 5G NR/NR-U) data traffic using MSO (e.g., cable) network infrastructure while taking advantage of DOCSIS 3.1 and 4.0 Low Latency queue capabilities.

In one aspect of the disclosure, a computerized apparatus configured for classifying packetized data traffic is disclosed. In one embodiment, the computerized apparatus includes: a digital processing apparatus; one or more network interfaces in communication with the digital processing apparatus; and a storage device in communication with the digital processing apparatus and having at least one computer program disposed thereon in the form of a plurality of instructions.

In one variant, the instructions are configured to, when executed on the digital processing apparatus: receive a plurality of data packets issued from a user device; access first data from the plurality of data packets indicative of a destination network address; access second data from the plurality of data packets indicative of a QoS management parameter; and cause utilization of either a low-latency bearer or a best-efforts bearer for carrying the plurality of data packets from the computerized apparatus to the destination network address based at least on the accessed second data.

In one implementation, the first data comprises a destination IP address for upstream IP packets, and the second data comprises DSCP (differentiated services code point) data. The DSCP (differentiated services code point) data comprises DSCP data obtained via an S1 interface, and the computerized apparatus comprises a 3GPP Long Term Evolution (LTE) femtocell or node.

In another implementation, the DSCP (differentiated services code point) data comprises DSCP data obtained via an N3 interface, and the computerized apparatus comprises a 3GPP 5G NR (New Radio) compliant gNB or wireless node.

In a further embodiment, the plurality of instructions are further configured to, when executed on the digital processing apparatus, utilize third data within the plurality of data packets, the third data comprising QFI data found in one or more encapsulation headers of the plurality of data packets.

In another aspect of the disclosure, a method of parsing data traffic into separate queues is disclosed. In one embodiment, the method is implemented by a network apparatus in order to meet one or more of quality of service (QoS) and quality of experience (QoE) standards, and the separate queues include a Low Latency queue and a Normal/Classical queue, as supported by DOCSIS 3.1 or 4.0.

In one variant, the data traffic includes small cell wireless traffic generated using 5G, 4G, and/or 4.5G network infrastructure. In one implementation, the data traffic includes Internet Protocol packets, and the IP packets include IP headers; e.g., IPv4 or IPv6 headers, IP outer headers (inside GTP user plane (GTP-U) encapsulated headers), and/or IP inner headers (inside GTP-U headers), and the method includes classifying data traffic using at least one sorting algorithm implementing one or more sorting stages and using different sorting parameters. The sorting parameters can include for example IP destination addresses, IP source addresses, APNs, GWs, Differentiated Services Code Point (DSCP) values, QoS Flow Identification (QFI) values, and/or network slice indicators.

In one embodiment, the classification uses the same sorting rule/algorithm to classify upstream/upload (UL) and downstream/download (DL) traffic during all sorting stages of the data traffic classification process. In another embodiment, the classification uses the same rule/algorithm to classify UL and DL traffic during one or more the stages of the classification process, and uses different rules/algorithms to classify the UL and DL traffic during other stage(s) of the process. In yet another embodiment, the classification uses different rules/algorithms to classify UL and DL traffic during all sorting stages of the classification process.

In another approach, the sorting algorithm(s) use only first sorting parameters to classify the data traffic in one sorting stage. In one such variant, the sorting parameters include network slice indicators, and the sorting algorithm classifies data traffic belonging to a network slice into one of the DOCSIS supported queues. In one implementation thereof, the network slice indicates a low latency services requirement, and the queue is the Low Latency DOCSIS queue. In another implementation, the network slice indicates no low latency requirement, and the queue is the Normal/Classical DOCSIS-supported queue.

In another implementation, the sorting algorithm ignores various other parameters (e.g., DSCP values) of the individual data packets of the data traffic belonging to the network slice.

In another variant, the sorting parameters include IP source and/or destination addresses. For example, the sorting algorithm is configured to classify data traffic heading towards or originating from particular destinations as belonging to the Low Latency or Normal queues.

In yet another embodiment, the sorting algorithm uses first sorting parameters to classify the data traffic in a first stage, and second sorting parameters to re-classify some or all of the data traffic in the second stage. The sorting algorithm can in one such adaptation parse the data traffic into Low Latency and Normal queues, with e.g., the first sorting parameters including IP destination and/or source addresses, and the second sorting parameters including DSCP values, or the first sorting parameters including DSCP values and the second sorting parameters including IP destination and/or source addresses.

In another embodiment, the sorting algorithm (i) evaluates and sorts data traffic into low latency (LL) and best effort (BE) traffic in the first sorting stage, (ii) feeds some or all of the sorted data traffic to the second sorting stage, (iii) evaluates some or all of the data traffic in the second stage, (iv) re-sorts at least some of the evaluated data traffic into LL and BE in the second sorting stage; and (v) fees the LL and BE data traffic to respective Low Latency and Normal queues. In one such variant, at least some of the data traffic sorted in the first sorting stage is fed directly to the Low Latency and/or Normal queues. In another variant, all of the data traffic sorted in the first sorting stage is fed to the second sorting stage.

In a further embodiment, a sorting stage may use IP address as a sorting parameter. The sorting algorithm may for example extract/read source and/or destination IP addresses from IP headers of data packets, and compare the source and/or destination IP addresses against one or more lists of prioritized/deprioritized IP addresses. For instance, in one approach, the sorting algorithm uses lists of IP addresses to prioritize or de-prioritize data traffic to or from: (i) certain customers or subscribers, (ii) certain levels or classes of customers or subscribers, (iii) a network operator's own servers, systems, or services, (iv) network servers providing particular types of services, (v) certain companies and businesses, for example, partners or affiliated corporations, and/or (v) particular geographic locations.

In one implementation, the IP address may be an individual address, or alternatively one or more ranges of addresses. The lists of IP addresses may include different tiers of priority, separate lists of source/destination addresses for UL traffic, separate lists of source/destination addresses for DL traffic, and/or hierarchical lists of addresses (e.g., sorted by priority).

In some variants, the sorting stage that uses IP address(es) for sorting can include one or a combination of: (i) for all traffic, sorting using IP source addresses with the same sorting rule/algorithm (e.g., compare against the same IP address list); (ii) for all traffic, sorting using IP destination addresses with the same sorting rule/algorithm; (iii) for all traffic, sorting using IP source and destination addresses with the same sorting rule/algorithm; (iv) for UL traffic, sort using destination IP addresses; for DL traffic, sort using source IP addresses; (v) for UL traffic, sort using source IP addresses; for DL traffic, sort using destination IP addresses; (vi) for UL traffic, sort using source and destination addresses; for DL traffic, sort using either source or destination addresses; (vii) for UL traffic, sort using either source or destination addresses; for DL traffic, sort using source and destination addresses; (viii) for all traffic, sorting using both source and/or destination addresses, and apply different rules/algorithms to UL and DL traffic; (ix) using different address lists/algorithms to sort traffic labeled as LL or BE in a previous sorting stage.

In another embodiment, a sorting stage uses DSCP values as sorting parameters. The sorting algorithm is configured to extract/read DSCP values from data packets and compare the DSCP values against one or more lists of DSCP values. The DSCP values may be read for example from the DS fields of IP headers. In one implementation, the DSCP values are based on QFI values of 5G NR traffic, and can include hierarchical listings of DSCP values with one or more DSCP list thresholds (used to e.g., divide the hierarchical listings of DSCP values into tiers). The sorting algorithm may also use the list(s) of DSCP values to prioritize and/or de-prioritize types of traffic, e.g., prioritizing voice/video/live gaming services or AR/VR traffic. In one approach, the sorting stage that uses DSCP values as sorting parameters can include one or a combination of: (i) for all traffic, DSCP sorting using the same rules/algorithms (same DSCP listing and thresholds); (ii) DSCP sorting using different rules/algorithms for UL and DL traffic; and (iii) DSCP sorting using different rules/algorithms to sort traffic labeled as LL or BE in a previous sorting stage.

In yet a further embodiment, the sorting algorithm uses (i) first sorting parameters to classify the data traffic in a first sorting stage, (ii) second sorting parameters to re-classify some or all of the data traffic in a second sorting stage, and (iii) third sorting parameters to re-classify some or all of the data traffic in a third sorting stage.

In another aspect of the disclosure, a method of delivering digital content to one or more computerized client device via a content delivery network is disclosed. In one embodiment, the method includes transporting the digital content in the form of packetized data traffic from a content delivery network hub to a network access node using a coaxial cable medium of an HFC cable plant. In one variant, the method includes sorting the data traffic into Low Latency and Normal data traffic, and using respective Low Latency and Normal queues of DOCSIS 3.1/4.0 to transport the data traffic over the cable plant. In one implementation, the sorting of the data traffic may be performed at a CMTS device. In another variant, the sorting of the data traffic may be performed at a network entity connected to a CMTS device. In yet another variant, the sorting may be performed in an MHAv2 or other CCAP-enabled entity such as an RPD.

In another aspect, a method of backhauling packet data traffic using cable network infrastructure is disclosed. In one embodiment, the cable infrastructure is part of an HFC network operated by an MSO and, the method includes receiving one or more data packets at a network entity (e.g., network access node, small cell, network hub); determining that the data packets need to be transported using a cable backhaul; applying a sorting algorithm to the data packets to sort the data packets into low latency and normal queues; transmitting the sorted data packets from a cable modem (CM) or a cable modem termination system (CMTS) using DOCSIS 3.1 or 4.0, such that the sorted data packets are transmitted through appropriate Low Latency and Normal queues.

In yet a further aspect, a method of supporting 5G NR network slicing functionality is disclosed. In one embodiment, the method includes: obtaining data traffic; determining that the data traffic belongs to a network slice; determining one or parameters associated with the network slice (e.g., security/privacy/bandwidth/privacy requirements); based on the one or more parameters, selecting either a first (e.g., Low Latency) or second (e.g., Normal or non-low latency) queue for transmission of the data traffic; and sending the data traffic via a bearer medium using at least the selected queue. In one variant, one of the parameters is a low latency requirement for the network slice, and the method includes selecting the first queue for the traffic.

In another aspect, a classification apparatus (CA) configured to classify data traffic is disclosed. In one embodiment, the classification apparatus is in data communication with a cable modem (CM) or a cable modem termination system (CMTS). In one variant, the classification apparatus includes: a digital processing apparatus; a data interface in communication with the digital processing apparatus; and a storage device in data communication with the digital processing apparatus and having at least one computer program disposed thereon in the form of a plurality of computer-executable instructions.

In one implementation, the at least one computer program is configured to, when executed on the digital processing apparatus: receive data packets; extract information from the data packets; based on the extracted information, parse the data packets into different ones of a plurality of queues or other data retention structures, and transmit the parsed data packets through the queues consistent with an extant PHY queuing approach.

In a further aspect, a network apparatus configured to enable transportation of packetized data traffic through an HFC cable plant is disclosed. In one embodiment, the network apparatus is a wireless network access node compliant with a 3GPP 4G/4.5G/5G standard (e.g., LTE, LTE-LAA, or 5G NR-U). The access node may use for example licensed or unlicensed or quasi-licensed (e.g., CBRS GAA or PAL) spectrum. In one embodiment, the network apparatus includes: a digital processing apparatus; a data interface in data communication with the digital processing apparatus and configured for data communication with a computerized client device; a data classifier apparatus in communication with the processor apparatus; and a storage device in data communication with the digital processing apparatus and having at least one computer program disposed thereon in the form of a plurality of computer-executable instructions.

In one variant, the at least one computer program is configured to, when executed on the digital processing apparatus, receive one or more data packets from the computerized client device, sort the data packets into different queues, and transmit the sorted data packets through respective queue mechanisms. In one implementation, the network apparatus is integrated with a wireless small cell or femtocell or CBRS CBSD and includes a DOCSIS-based modem functionality for backhaul of the data to the HFC cable plant.

In one aspect, a content delivery network architecture configured to enable prioritized or optimized transportation of packetized data traffic through cable infrastructure is disclosed. In one embodiment, the content delivery network includes an HFC distribution network, one or more gateway devices, and one or more wireless network access nodes. In one embodiment, the content delivery network is configured to provide content/services to a plurality of computerized client devices via the one or more access nodes.

In another aspect, a method of providing vendor- or carrier-specific data packet routing using queueing is disclosed.

In yet a further aspect, methods and apparatus supporting selective 5G NR network slicing within a managed content distribution network are disclosed.

In another aspect, an integrated circuit (IC) device implementing one or more of the foregoing aspects of data packet routing or prioritization or processing is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In yet another embodiment, the apparatus comprises a "cloud" (network) based storage device which is remote from yet accessible via a computerized user or client electronic device.

In another aspect of the disclosure, methods and apparatus for sorting and prioritizing data within a CCAP architecture are disclosed. In one variant, the CCAP architecture uses an M-CMTS apparatus as part of its MHA (modular headend architecture). In another variant, a fully integrated CCAP headend is used.

These and other aspects shall become apparent when considered in light of the disclosure provided herein.

BRIEF DESCRIPTION OF THE DRAWINGS

FIG. 2 is a logical flow diagram illustrating an exemplary embodiment of a method for sorting data traffic, according to the present disclosure.

FIG. 2E is a table illustrating exemplary DSCP values enumerating different traffic types.

Figure 1:
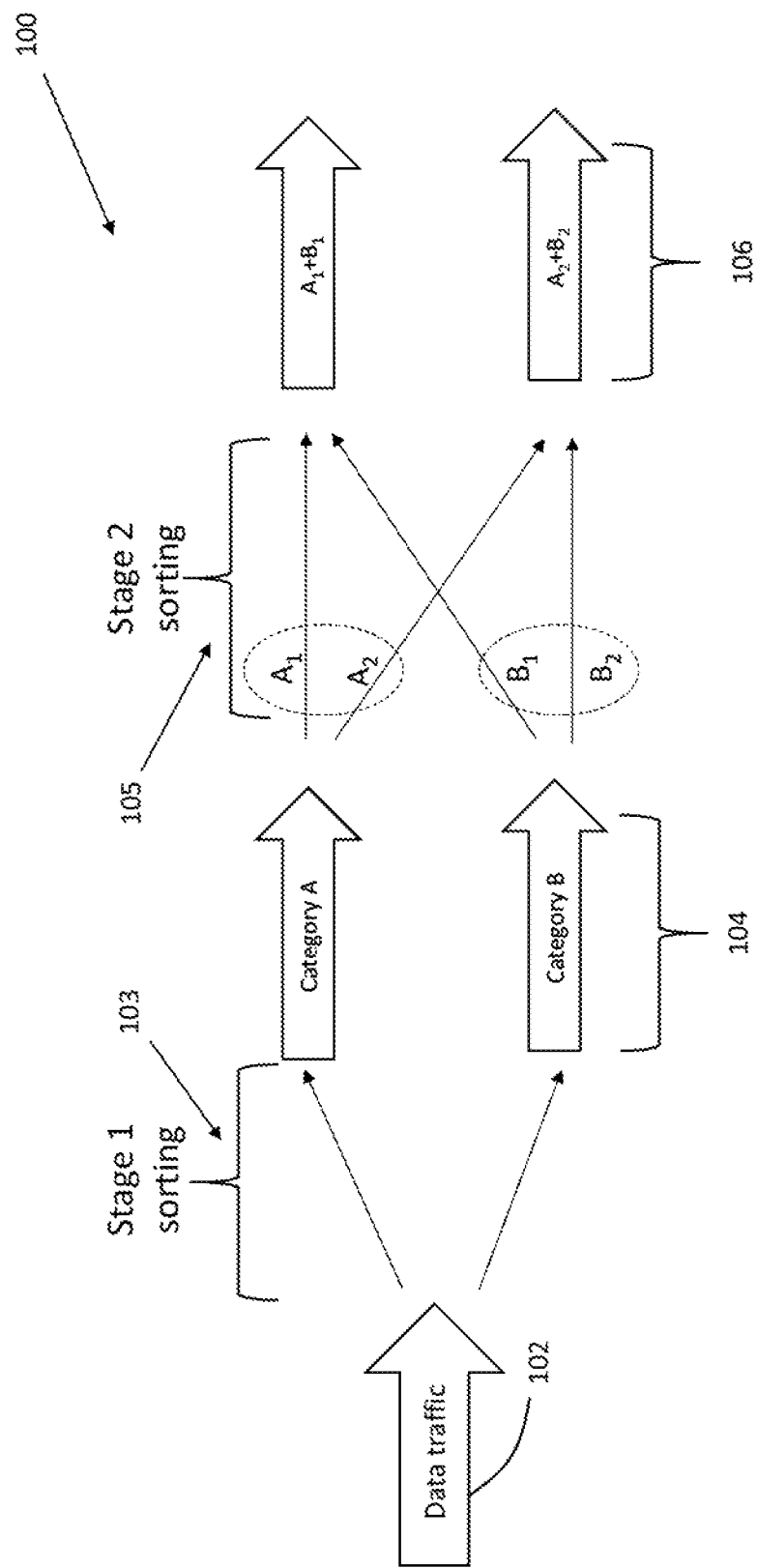
FIG. 1 is a logical block diagram illustrating one embodiment of a generalized method for sorting data traffic, according to the present disclosure.

All figures © Copyright 2019 Charter Communications Operating, LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the term "client device" includes, but is not limited to, CPE, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones, IoT devices, and vehicle infotainment systems.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Ruby, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, GDDRx, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, GPUs, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, optical networks (such as PONs), hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., optical fiber, wired/RF cable, RF wireless, millimeter wave, etc.) and/or communications or networking protocols (e.g., SONET, DOCSIS, IEEE Std 802.3, ATM, X.25, Frame Relay, 3GPP, 3GPP2, WAP, SIP, UDP, FTP, RTP/RTCP, TCP/IP, H.323, etc.).

As used herein, the term "DOCSIS" refers to any of the existing or planned variants of the Data Over Cable Services Interface Specification, including for example DOCSIS versions 1.0, 1.1, 2.0, 3.0, 3.1, and 4.0 (previously, Full Duplex 3.1). As used herein, the term "legacy DOCSIS" refers to all DOCSIS version preceding DOCSIS 3.1 and "current DOCSIS" refers to DOCSIS versions 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the term "cable modem termination system" (CMTS) refers without limitation to a device located at a cable system headend of distribution hub, which provides complementary functionality to the cable modems to enable data connectivity to a wide-area network.

As used herein, the term "LTE" refers to, without limitation and as applicable, any of the variants or Releases of the 3GPP Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "network interface" refers to any signal or data interface with a component or network including, without limitation, those of the FireWire (e.g., FW400, FW800, etc.), Thunderbolt, USB (e.g., USB 2.0, USB 3.0, etc.), DisplayPort, NVLink, Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15 or BLE), power line carrier (PLC), or IrDA families.

As used herein, the term "server" refers to any computerized component, system or entity regardless of form which is adapted to provide data, files, applications, content, or other services to one or more other devices or entities on a computer network.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "storage" refers to without limitation computer hard drives, SSDs, DVR devices, flash drives, memory, RAID devices or arrays, optical media (e.g., CD-ROMs, Laserdiscs, Blu-Ray, etc.), or any other devices or media capable of storing content or other information.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, 5G NR, analog cellular, CDPD, satellite systems, millimeter wave or microwave systems, acoustic, and infrared (i.e., IrDA).

Overview

The present disclosure provides, inter alia, improved methods and apparatus for providing high quality, low latency cable-based transmission using extant protocols and infrastructure (e.g., DOCSIS 3.1 or 4.0) for backhauling data traffic (e.g., that being transacted with a 4G, 4.5G, or 5G NR wireless access node or "small cell"). In one aspect, the present disclosure seeks to granularly parse small cell data traffic into different categories (e.g., Low Latency and Normal queues as supported by the DOCSIS 3.1 and 4.0 standards) using one or more of packet source/destination address information, gateway information, DSCP values, and/or QFI values.

In one exemplary embodiment, a method and apparatus are provided for parsing 5G NR data traffic in order to transport the data traffic through existing cable (e.g., HFC) infrastructure (e.g., using DOCSIS 3.1/4.0 Low Latency support) to meet required QoS/QoE or other performance requirements. The 5G NR data traffic may be provided in the form of protocol data units (PDUs) having IP headers encapsulated by GTP-U headers via a 5G network node (e.g., a small cell) having a backhaul cable connection to an MSO network infrastructure. In one variant, a classifier apparatus and cable modem are integrated with the network node for processing and forwarding the data traffic to meet the above-referenced performance requirements. The classifier apparatus extracts and reads the IP source address, the IP destination address, and the DSCP value from IP headers of the data traffic. The sorting algorithm of the classifier may use the IP source and/or destination addresses to perform an initial (i.e., "stage 1") classification/parsing of the data traffic the stage 1 sorting process is then used to give priority to data packets received from or being transmitted to predetermined network entities, for example, customers/subscribers, customers/subscribers having a particular subscription level, particular companies/businesses, network operator's own servers/services, particular network servers or services, to support a particular 5G NR network slice, etc. In one implementation, the sorting algorithm may prioritize certain destination IP addresses for upstream data traffic (e.g., traffic from small cell) and certain source IP addresses for downstream data traffic (e.g., traffic from HFC network to a small cell) over other types of traffic such as that with inherently lower performance requirements.

The sorting algorithm may also perform a second ("stage 2") classification/parsing of the data traffic using for instance DSCP values in order to, in effect, re-classify the priority of some of the stage 1-sorted data packets. The DSCP values may be based for example on a QFI of the 5G NR data packets. In one approach, the sorting algorithm compares DSCP values of the data packets against a predetermined list or order of DSCP values (the latter which may itself be sorted by priority).

In one embodiment, the classifier apparatus uses the two stages of the sorting algorithm to parse the data traffic into Low Latency and Normal/Best Effort queues, as supported by the DOCSIS 3.1/4.0 standards. The parsed data traffic is fed into appropriate Low Latency and Normal queues, such that the Low Latency queue data packets are scheduled with a strict priority while the Normal queue data packets are scheduled with a weighted priority (e.g., order of packets within the Normal queue may be dynamically adjusted, such as based on operator input or based on algorithmic input from a supervisory or other process).

The foregoing method and apparatus advantageously make use of existing packet data (e.g., IP addresses and DSCP values) to parse small cell data traffic that is slated for transmission over a cable plant, in order to take advantage of current DOCSIS QoS support for achieving MSO-specific requirements or goals for handling of the traffic (e.g., to ensure that MSO users or subscribers have the best possible QoE when utilizing the MSO's infrastructure). This capability is particularly useful to the MSO deploying unlicensed spectrum assets (e.g., NR-U devices) at its customer or subscriber premises, since extant cable drops and backhaul can be used to support the high performance requirements of 5G technology without having to install or replace such backhaul with e.g., fiber or another medium.

Detailed Description of Exemplary Embodiments

Exemplary embodiments of the apparatus and methods of the present disclosure are now described in detail. While these exemplary embodiments are described in the context of the previously mentioned wireless access nodes (e.g., small cells) associated with or supported at least in part by a managed network of a service provider (e.g., MSO and/or MNO networks), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., outdoors, commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Wireless

As a brief aside multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation), "4G" (fourth generation), and "5G" (fifth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |
| 5G | 600 MHz |
| | 800 MHz |
| | 900 MHz |
| | 2500 MHz |

TABLE 1-continued

| Technology | Bands |
|---|---|
| | 3550 MHz |
| | 3700-4200 MHz |
| | 28 GHz |
| | 37 GHz |
| | 39 GHz |
| | 47 GHz |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

One wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

5G New Radio (NR) and NG-RAN (Next Generation Radio Area Network)—

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

Exemplary Methods—

FIG. 1 illustrates an exemplary architecture 100 for parsing data traffic 102 according to e.g., prioritization. In the illustrated example, the incoming data traffic 102 is parsed via a first stage ("Stage 1") process 103 and a second stage process 105 before being allocated to primary and secondary queues or buffers 104, 106. As shown in FIG. 1, the first stage sorting process 103 will parse or sort the data packets according to a first category (A) and second category (B) based on e.g., a top-level or primary sort criterion, while the second stage further sorts the Stage-1 sorted packets according to a second-level criterion. This approach advantageously allows for instance the MSO or other network operator to achieve a much higher level of granularity on its data traffic, including low-latency 5G-related traffic which must obey certain QoS/latency requirements.

It will be appreciated that the queues or buffers 104, 106 shown in FIG. 1 may comprise any number of different configurations (e.g., FIFO or otherwise), and may also include multiple individual queues or buffers, such as for overflow (e.g., as one queue/buffer is filled, it "spills over" to a second queue/buffer, and so forth). Moreover, the queues/buffers may also be implemented as partitioned portions of memory or addressable storage space within the same device (e.g., a common SRAM).

The multiple stages of the architecture of FIG. 1 may also be "pipelined" or made lock-step from the standpoint of data flowing therethrough, such as e.g., where the sorting process of Stage 1 103 must be completed on a prescribed portion of the data before Stage 2 processing completed, such as according to a clocking domain. Other schemes for managing data flow through the architecture 100 will be recognized by those of ordinary skill given the present disclosure.

It will also be appreciated that the architecture 100 may utilize multiple stages of sorting (which may include other processing) that occur without an intervening queue or buffer structure. That is, the Stage 1 and Stage 2 processing may be accomplished algorithmically without any physical segregation of packets until delivery to queues or buffers at the outlet of the Stage 2 process(es).

Figure 1A:
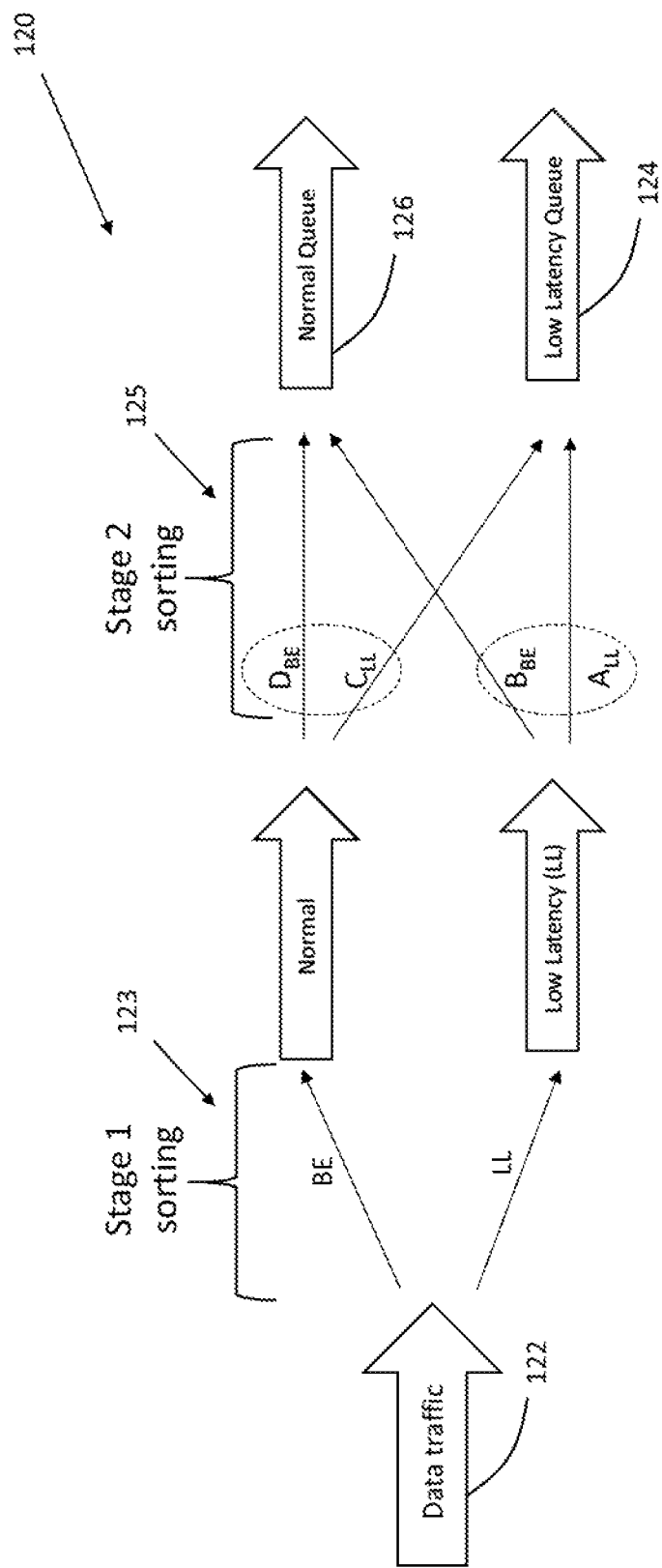
FIG. 1A is a logical block diagram illustrating one implementation of the generalized method of FIG. 1, adapted for DOCSIS queuing.

FIG. 1A illustrates one implementation 120 of the architecture of FIG. 1, specifically in terms of Low Latency (LL) and Normal/Best Effort queues, The Low Latency queue 124 contains the set of data packets that are awaiting transmission on the "Low Latency Service Flow", as defined by DOCSIS 3.1/4.0, while the Normal queue 126 contains the set of data packets that are awaiting transmission on the "Classic Service Flow", as defined by DOCSIS 3.1/4.0.

The data traffic 122 may be packetized traffic (e.g., encoded digital content carried within a packet or frame structure or protocol) received at a network node belonging to, e.g. a small cell network and an MSO network. The node can take any number of form factors, including (i) co-located with other MSO equipment, such as in a physically secured space of the MSO, (ii) "strand" or pole mounted, (iii) surface mounted, and (iv) buried, so as to inter alia, facilitate most efficient integration with the extant HFC (and optical) infrastructure, as well as other 4G/4.5G/5G components. The data traffic 122 is processed (i.e. parse) for DOCSIS 3.1/4.0 transmission using a classifier apparatus. As noted above, the classifier apparatus may be located at the network node, within or in physical proximity to a cable modem, at another network device (off-premises), and/or distributed/virtualized within the network architecture. Ideally, to minimize latency, exemplary embodiments of the disclosure utilize the classifier apparatus within the wireless access node (e.g., 5G gNB controller unit or CU; see FIG. 8 herein), thereby obviating any intervening transmission or processing by another entity. To that end, the present disclosure also contemplates that the classifier apparatus may also reside within an MNO 5G RAN or network component, such as an AMF or even the 5GC.

Referring again to the embodiment of FIG. 1A, during the first sorting stage 123, the data traffic 122 is initially classified using first parameters into initial Low Latency (LL) traffic and Normal/Best Effort (BE) traffic. During the second sorting stage 125, the data traffic is sorted using second parameters such that: (i) some of the initial LL traffic ($B_{BE}$) is re-classified into the Normal queue; (ii) some of the initial Normal traffic ($C_{LL}$) is re-classified into the LL queue; (iii) some of the original LL traffic ($A_{LL}$) stays in the LL queue; and (iv) some of the original BE traffic) ($D_{BE}$) stays in the BE queue. After the second sorting stage 125, the reclassified traffic is transmitted to the appropriate Low Latency 124 or Normal 126 queues of the DOCSIS 3.1/4.0 process backhauling the node (e.g., wireless access node or gNB).

Figure 1C:
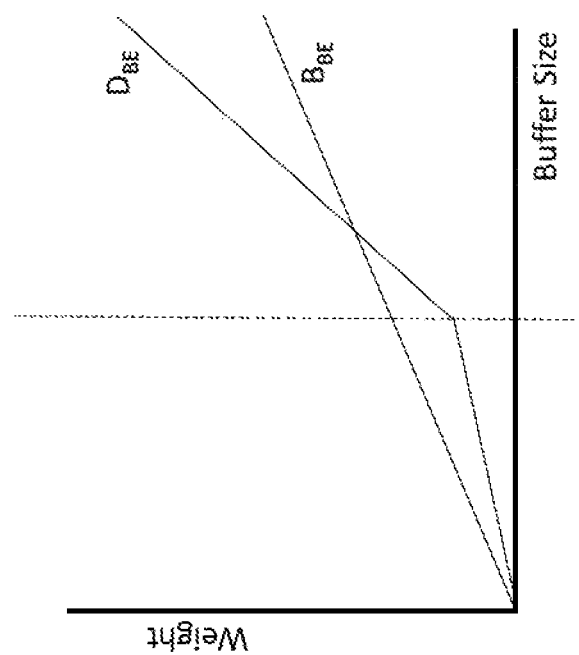
FIG. 1C is a graph of Normal queue data traffic weight/priority, according to one embodiment of the present disclosure.
Figure 1B:
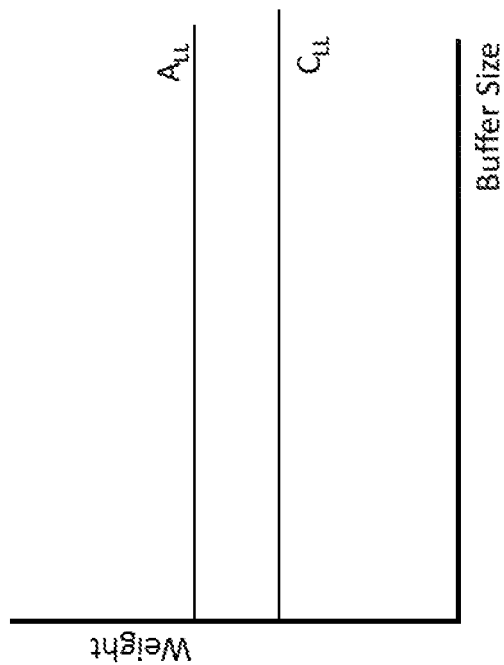
FIG. 1B is a graph of Low Latency queue data traffic weight/priority, according to one embodiment of the present disclosure.

In one embodiment, the traffic scheduled for the Low Latency queue 124 ($A_{LL}$ and $C_{LL}$) follows a strict priority, independent of traffic patterns/buffer size, i.e., as illustrated in FIG. 1B, all of the originally (stage 1) sorted Low Latency traffic ($A_{LL}$) has priority (weight) over traffic that has been re-sorted into the Low Latency queue 104 during stage 2 ($C_{LL}$). In addition, the Low Latency queue 124 should not actually build up a large buffer, since by definition it is designed to pass on traffic with low latency. The traffic scheduled for transmission through the Normal (Classical) queue 126 does not adhere to a strict priority. The data packets in the Normal queue 126 may be dynamically assigned different priorities (within the Normal queue 126 itself) based on traffic flow/buffer size. For example, as illustrated in FIG. 1C, the originally sorted Best Effort traffic ($D_{BE}$) may receive lower priority than traffic that has been re-sorted into the Normal queue ($B_{BE}$) until the Normal queue 106 reaches a certain size (vertical dotted line), at which point the priority of the originally sorted Best Effort traffic starts to rise, and eventually overtakes the priority of the re-sorted traffic.

In one implementation, the foregoing non-linearity or change in queue logic is configured so that the traffic in the B queue is not continuously blocked by the D traffic (i.e., the D queue traffic does not block or lock out the B queue traffic indefinitely or even for protracted periods). In one configuration, the D queue traffic has higher priority unless the B queue fills to a certain point (which may be operator specified, or alternatively selected by one or more algorithms based on e.g., AI or ML such as those based on traffic latency and/or queue levels or some other metric(s) of blocking) at which point the B queue traffic then has priority for some prescribed period of time or until another criterion is met (which may also be user-specified or algorithmically determined).

As such, the present disclosure also contemplates a variety of other schemes for determining differential rules or logic to be applied to queuing consistent with the methods and apparatus described herein, such as in different operational scenarios or conditions within the plant. It will also be recognized that criteria and logic may be mixed across different queue instances, and even for the same queue instance at different times or in different applications.

In one embodiment, the first (Stage 1) parameters may include address/location information, such as one or a combination of: (i) IP source addresses, (ii) IP destination addresses, (iii) access point names (APNs), and/or (iv) GW names/addresses. Likewise, addresses or other nomenclature or identifiers associated with other network nodes or endpoints that can be used as a basis for classification into services (or classes of services) that are then used to prioritize traffic. As one example of the foregoing, the first sorting stage may be used to initially sort all upstream IP packets based on their destination IP addresses (e.g., prioritize traffic headed to one or more particular MSO servers), and sort all downstream headed packets based on their source IP addresses (e.g., prioritize traffic originating from servers known to provide live video or AR/VR/gaming content). The second parameters (Stage 2) may include for example DSCP markings (which may be based on QFI values). For example, some of the data traffic originally sorted into the Normal queue may be resorted into the LL queue according to a high priority DSCP value (e.g., DSCP=46, traffic requiring expedited services).

In a second embodiment, the first parameters (Stage 1) include DSCP/QFI values and the second parameters (Stage 2) include address/location information; i.e., the data traffic is originally sorted according to DSCP values, and then partially re-sorted based on source/destination information.

In another embodiment, the first parameters may include source address information, and the second parameters may include destination address information. For example, for upstream traffic (i.e., from the access node toward the MSO or MNO core), the classifier might initially sort based only on destination addresses (e.g., is a subscriber request heading towards a priority network server), and then reclassify some of the traffic based on source addresses (e.g., does the request originate from a high-priority subscriber). In one variant, the traffic may further be evaluated and reclassified again using DSCP/QFI values using a third sorting stage of the classifier (not shown). To that end, it will be appreciated that the exemplary two-stage approach shown in the embodiments of FIGS. 1-2B herein may be modified to include one or more additional stages, whether after Stage 2 or interposed between Stages 1 and 2. For instance, a third stage may be added after Stage 2 in the above architectures to further refine sorting of the packets based on a subnet mask (e.g., one stage sorts based on a network identifier/ routing prefix field, and the subsequent stage on a subnet/ host identifier).

It will also be appreciated that a single (or multiple) sorting stage(s) may be used to classify all traffic in a particular network slice as belonging to either the Low Latency or the Normal queue, and address/DSCP information is not used in the classification. As a brief aside, 5G NR Network slicing provides for creation of a logical end-to-end network. Slices are dynamically created, and different slices can be utilized for different services types. For instance, committed services can be allocated to different slice types, or slices can be allocated to dedicated customers. Components of a given slice may include 5G Core network (CP and UP) components, 5G RAN components, and Interworking Functions to non-3GPP Access Networks. In general, a UE can connect a maximum of eight (8) slices in parallel, and utilizes a common AMF in all such slices.

Per TS 23.501, slice identification can include the S-NSSAI (Single Network Slice Selection Assistance Information, having an SST (slice type which describes expected network behavior) and an SD (slice differentiator for further differentiation). Moreover, the S-NSSAI SST can have standard or network-specific values; e.g., eMBB (enhanced mobile broadband), URLCC (ultra-reliable low-latency communications), or MIoT (massive IoT). Similarly, an NSSAI is a collection of a maximum of eight (8) S-NSSAI values; for example, in operation, a UE may send the NSSAI based on which related slice(s) are selected.

Hence, one or more stages of the architecture discussed above may utilize one or more of the foregoing S-NSSAI, NSSAI, or other values as a criterion or bases for sorting (e.g., all URLCC SST values are sorted into the low-latency queue).

It is also appreciated that the sorting stages may be dynamically (i) reconfigured, and/or (ii) added subtracted from the "pipeline." For example, in one configuration, the stages are reprogrammable (such as via an FPGA or other high-speed configurable processing element) such that a given classifier apparatus can be reconfigured on-the-fly to implement different sorting models depending on the needs of user devices or services types served. For instance, where a certain type of use device/use scenario may benefit from a two-stage model having DSCP/destination address sorting approach, another user device/scenario may benefit instead from a SST/DSCP/address model, and so forth.

Figure 2A:
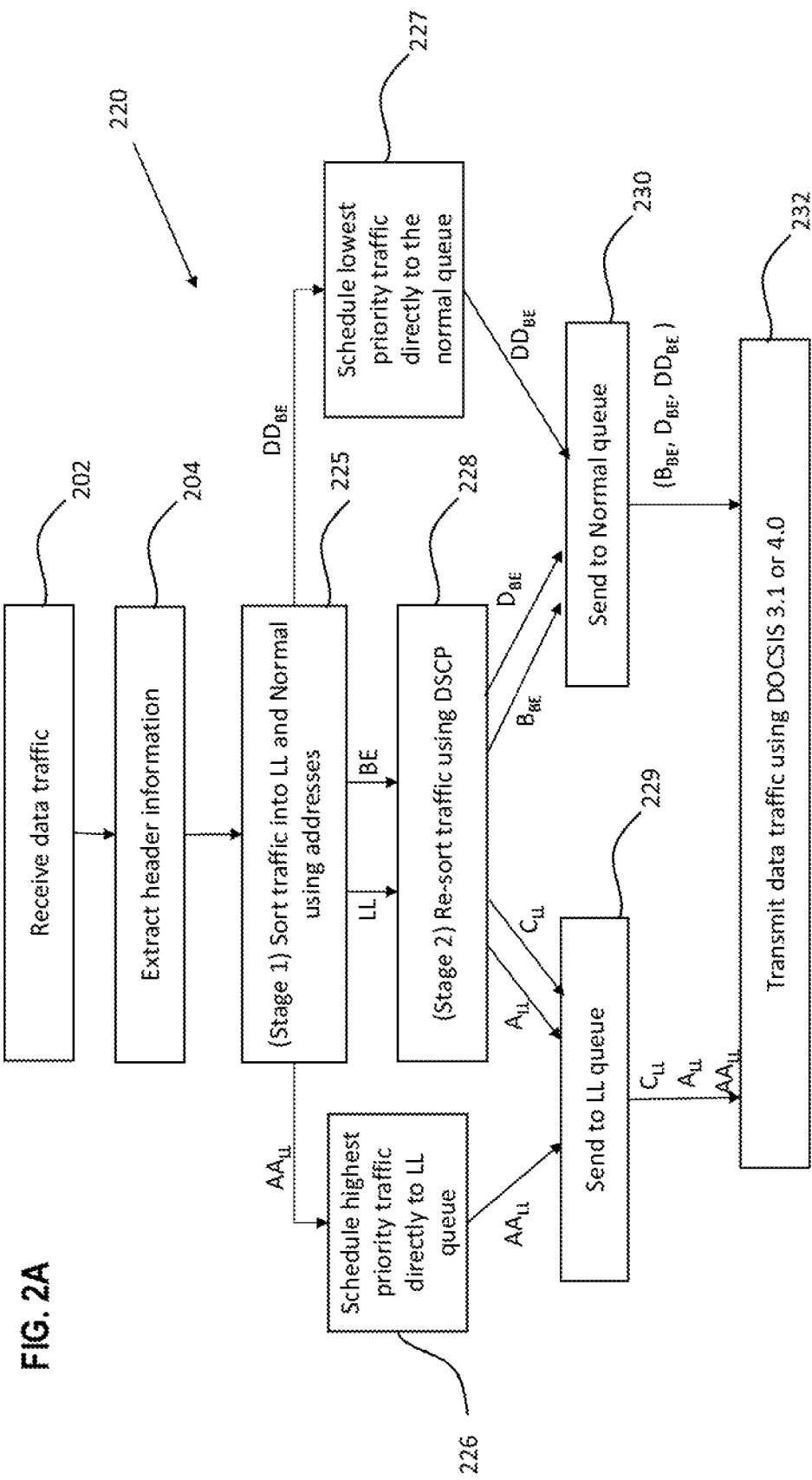
FIG. 2A is a logical flow diagram illustrating one implementation of the method for sorting data traffic, according to the present disclosure.
Figure 2B:
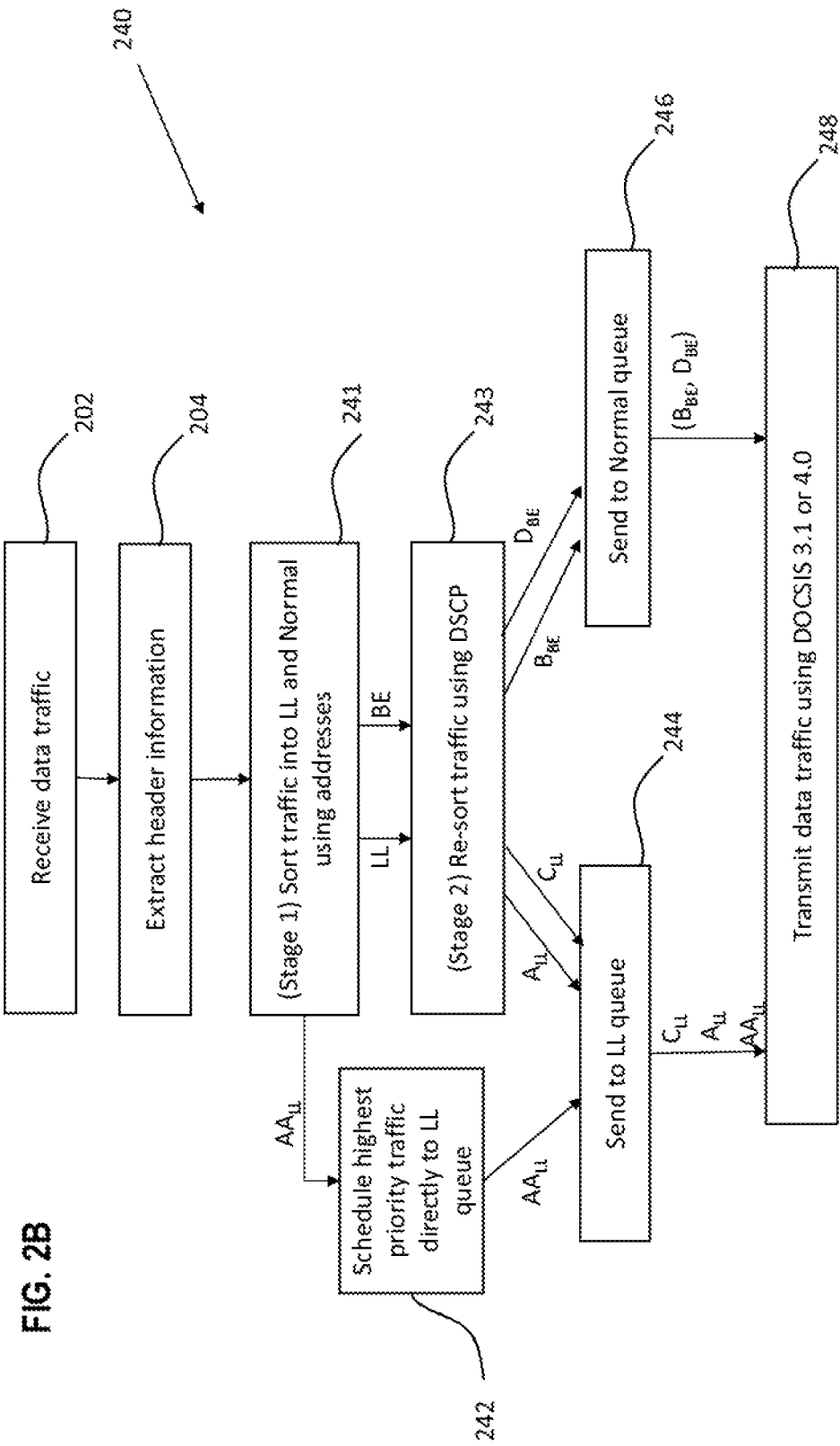
FIG. 2B is a logical flow diagram illustrating another implementation of the method for sorting data traffic, according to the present disclosure.
Figures 2C, 2D:
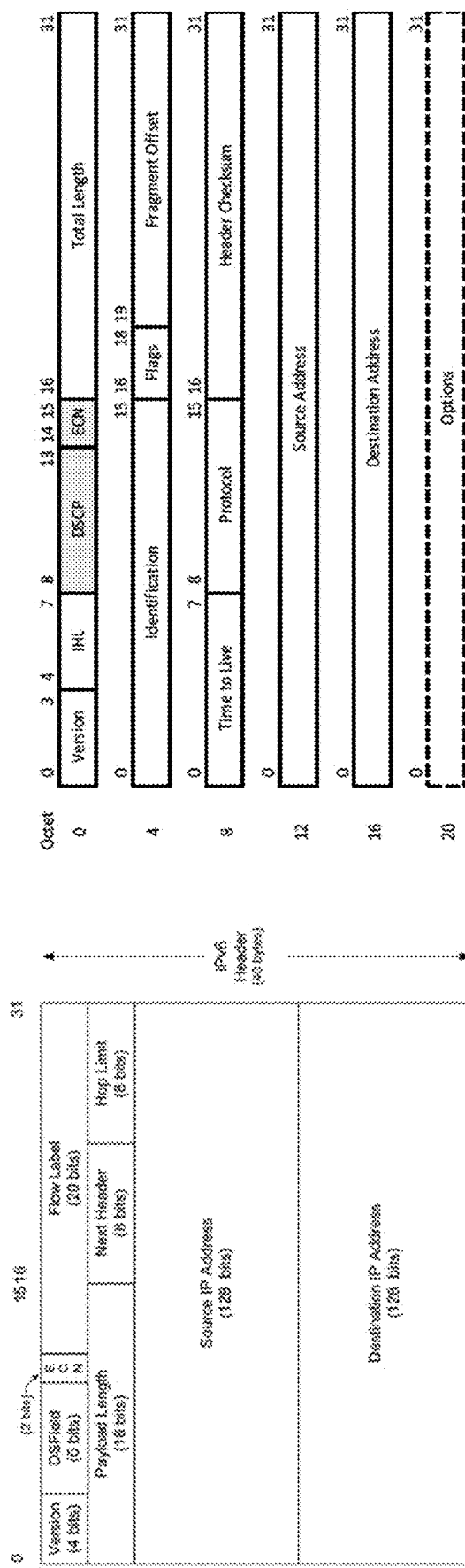
FIGS. 2C and 2D are graphical illustrations of exemplary IP packet protocols (IPv4 and IPv6) useful with various embodiments of the present disclosure.

FIGS. 2-2B illustrate various exemplary embodiments of methods 200, 220, 240 for classifying data traffic into low latency and normal queues, according to the present disclosure.

Referring first to the embodiment of FIG. 2, data traffic is received by a classifier apparatus or process in step 202. As described subsequently herein, the classifier apparatus/process may be located at customer premises, at a network node (e.g., within a wireless access node or 5G NR gNB), at or inside a cable modem, at or inside a cable modem termination system, and/or other parts of the network architecture. In addition, some of the functions of the classifier apparatus (e.g., sorting algorithm) may be distributed at various network locations, including in cloud server(s) and associated storage.

In one embodiment, the data traffic includes IP packet data in the form of protocol data units (PDUs). The data packets include IP headers (e.g., IPv4 or IPv6 headers; see FIGS. 2C and 2D), and may additionally be encapsulated by GTP-U headers. At a high level, GTP-U (GTPS tunneling protocol) is used to tunnel IP packets in 4G and 4.5G networks. In addition, 3GPP RAN and CT4 have decided to use GTP-U as the 5G user plane encapsulation protocol between the RAN (gNB) and the user plane function (UPF).

Per TS.38.415, a G-PDU is a PDU that includes a GTP-U header, while a T-PDU is a PDU that the GTP-U header encapsulates.

Data packets having headers encapsulated by GTP-U retain all their original IP header information in the "inner" IP headers of the GTP-U header. In addition, the "inner" IP header information is normally copied exactly in the "outer" IP headers of the GTP-U headers. However, in certain circumstances, some values in the outer IP header may be changed by the GTP-U encapsulation. For example, for 5G NR traffic, the DSCP value in the outer IP header may be changed based on 5G QoS Flow Identifier (QFI) value of the traffic.

Returning to the method 200 of FIG. 2, at step 204, the classifier apparatus extracts and reads IP header data from the IP packets (PDUs). For non-GTP-U encapsulated IP packets, the IP header data includes, among other markings, a destination address (in the destination IP address field), a source address (in the source IP address field), and a DSCP marking (in the differential service field). For GTP-U encapsulated IP packets, the same information can be found in the outer IP header. FIGS. 2C and 2D (IPv6 and IPv4, respectively) show an IP header and the IP header fields, including: the differential service (DS) field, source address field, and destination address field.

Referring back to step 204, the source and destination addresses of the data packets may be read by the classifier apparatus from the Source IP Address and Destination IP Address fields of the IP headers of the data packets. The DSCP values may be read by the classifier apparatus from the DS field of the IP headers. As an aside, the DSCP value (see exemplary values in FIG. 2E) indicates the type of traffic being transmitted, and thus, the type of treatment the data traffic should preferably receive. For example, a DSCP value 46 normally indicates traffic that requires "expedited forwarding (EF)" and thus receives very high priority by the traffic manager, while DSCP of 0 indicates traffic that only necessitates "best effort" (BE) and thus receives routine priority by the traffic manager.

In step 206, the classifier apparatus uses the extracted source and destination data to perform an initial (Stage 1) classification of the data traffic into Low Latency (LL) and Normal/Best Effort (BE) traffic. The sorting algorithm of the classifier in one implementation compares source and/or destination IP addresses against one or more lists of important/priority IP addresses. In another implementation, gateway or other node names or other identifying data may be used (which then may be resolved to e.g., an IP address).

In one embodiment, the classifier treats uplink (UL) and downlink (DL) traffic using the same rules (e.g., the same sorting algorithm is used at subscriber cable modems and at network cable modem termination systems). In one such variant, the sorting algorithm can ignore destination address information, and use only the source IP addresses of data packets to assign priority to the data packets. In another such variant, the sorting algorithm can ignore the source address information, and use only the destination IP addresses of data packets to assign priority. In yet another such variant, the sorting algorithm can use both source and destination address information to assign priority to data packets. For instance, in one particular implementation, the sorting algorithm extracts the source and destination IP addresses, and compares both to a single list of "important" or prioritized IP addresses known to the network operator. The single list of IP addresses can include, e.g., known addresses of priority network servers, known addresses of business partners/affiliates, and/or known addresses of certain customers/subscribers. Data traffic traveling to and from the known IP addresses would receive higher than normal priority.

In another implementation, the sorting algorithm extracts the source and destination addresses of data packets, and compares them to different lists of IP addresses. For example, UL/DL treatment may be asymmetric, such as where data traffic sent to certain customers would receive higher than normal priority, but data traffic issuing from those same customers might not receive higher than normal priority.

In yet another implementation, the classifier apparatus/process compares the source addresses against the list of prioritized source addresses, and the result of the source address analysis is used as a gating criterion; i.e., to determine whether the destination address analysis (or yet another analysis) should be performed. Similarly, the classifier apparatus/process may analyze the destination address, and the result of the destination address analysis determines whether the source address is also analyzed. The decision to use "source-then-destination" or "destination-then-source" type of analysis might depend for example on whether the traffic is UL or DL traffic. As will be appreciated, in some use cases, traffic is more asymmetric (e.g., DL bandwidth for traffic requested by or to delivered to the end user or UE is significantly higher than UL traffic initiated from the user/UE), and as such certain models for "source-then-destination" or "destination-then-source" (especially in combination with other parametric-based processing) may be more advantageous in terms of latency or QoS than others.

Hence, the classifier apparatus may apply different sorting algorithms and/or different prioritized address lists to UL and DL traffic. This is implemented by, for example, providing one sorting algorithm to classifier apparatus or algorithms sorting data traffic for transmission to an MSO network core (e.g., at small cell CM) and providing a different sorting algorithm to classifiers sorting data traffic for transmission from an MSO core (e.g., at CMTS interface of an HFC network). In one variant, the sorting algorithm ignores source address information, and only uses destination addresses to assign priority to UL data packets, or conversely ignores destination address information, and only uses source addresses to assign priority to DL packets. This variant might be effective because an IP address of a mobile device "on-the-go" is often not useful in determining whether the mobile device belongs to a particular customer, subscriber, or company, and as such, reading and analyzing it could be a waste of time/processing resources. For example, a user device attempting to send (upload) data to a known network server (e.g., MSO server providing real time gaming services) might receive preferential treatment based on the fact that the destination address for the data traffic is an IP address known and prioritized by the network operator. Similarly, download data traffic to a user device from a known network server might receive preferential treatment. Since the user is communicating with the prioritized network server, this traffic might receive priority regardless of the user device's own location (e.g., IP address/access node/gateway).

Other variations of the foregoing will be appreciated by those of ordinary skill. For instance, the sorting algorithm may ignore destination address information, and only use source addresses to assign priority to UL packets, and ignore source addresses, and only use destination addresses to assign priority to DL packets. Or, the sorting algorithm may ignore source addresses for both DL and UL traffic, and only uses destination addresses to sort the data traffic. In one such approach, the destination addresses of DL data packets are compared to a first list of priority destination addresses (e.g., addresses of certain types of customers or businesses, addresses of particular customers or businesses), while the destination addresses of UL data packets are compared to a second list of priority addresses (e.g., addresses of certain types of network servers, particular service providers, particular network node addresses).

In yet another variant, the sorting algorithm uses the source and destination addresses for parsing both DL and UL traffic; the source and destination addresses of DL traffic are compared to one or different lists of priority DL addresses, while the source and destination addresses of UL traffic are compared to one or different lists of priority UL addresses. The lists of priority DL addresses and priority UL addresses may have some overlap, or may be completely different from each other.

The aforementioned listing of sorting criteria data (e.g., priority addresses) may be a simple listing, such as of all addresses and ranges of addresses that a network operator or vendor has determined should receive priority. In another variant, the list of prioritized data (e.g., addresses) is a hierarchical list or structure, sorted from "most important" to "least important" or according to some other metric. In yet another variant, the list of prioritized data is divided into tiers of importance. For example, Tier 1 may contain addresses that should always have priority, and be sorted into the Low Latency queue, Tier 2 may contain addresses that should have priority if some first condition is met (e.g., a priority queue or buffer level is below a certain threshold), and Tier 3 may have priority if some second condition is alternatively or also met (e.g., a priority queue or buffer level is below a certain threshold, and a traffic type classifier such as SST meets certain criteria).

The lists of prioritized addresses may include for example IP addresses of: specific businesses or corporations (e.g., company partners or affiliates), specific customers or subscribers, types of businesses or corporations (e.g., all news network addresses), types of customers or subscribers, a network operator's own servers and systems, servers or providers of specific services (e.g., known providers of live video). The addresses may be e.g., complete IP addresses such as AAA.BBB.CCC.DDD, or portions of the foregoing (e.g., routing prefixes or subnet masks).

The list of prioritized addresses may further be sorted or tiered, depending on, for example, level of customer subscription (which may be reflected by discrete or fuzzy variables or values such as "0-10" or "Gold/Silver/Bronze" or "high/low" or the like), or an internal ranking of e.g., MSO or third-party network servers.

The list of prioritized addresses may also be customized based on other factors such as (i) previous traffic behavior and analyses thereof, (ii) user/subscriber ranking/experience, and (ii) network operator priorities such as reliability, fault mitigation, "fair sharing" algorithms, load balancing, etc. Furthermore, the list of prioritized addresses or other prioritization data may be dynamically changed and updated based on, for example, a traffic-analysis feedback loop, a periodic (hourly, daily, etc.) update, or on an as-needed basis.

In one configuration, the classifier apparatus may also or alternatively utilize inverse-type logic; e.g., comparison of source and/or destination addresses against one or more lists of de-prioritized addresses. The lists of de-prioritized addresses may be simple, hierarchical, or tiered listings of all addresses and ranges of addresses that a network operator or vendor has determined should receive low or normal priority. This listing may include, for example, addresses of specific MSO servers that supply services that do not require high upload/download rates. This approach may be useful as a gating criterion (e.g., to immediately remove certain traffic from further processing), or in a situation where it is more efficient to merely identify what is not low-latency as opposed to what is.

Returning to FIG. 2, at step 206, the classifier apparatus may compare the source and/or destination addresses of every PDU against lists of prioritized addresses and/or lists of de-prioritized addresses. The lists of prioritized and de-prioritized addresses may be stored locally (e.g., on storage internal to the classifier apparatus) or remotely. The PDUs are sorted by the sorting algorithm of the classifier into Low Latency (LL) and Best Effort (BE) traffic. As shown in the embodiment of FIG. 2, all of the sorted data traffic (LL and BE) is transferred to Stage 2 of the classifier to potentially be reclassified.

Returning again to FIG. 2, in step 208, the classifier apparatus uses the extracted DSCP markings to re-sort the data traffic into Low Latency and Normal queues. During Stage 2 of the data traffic classification process, the classifier may compare the DSCP values of the data packets against e.g., a list of DSCP values.

In one embodiment, a listing of DSCP values includes selected DSCP values that should receive high priority, according to a previously established determination.

In another embodiment, a listing of DSCP values includes DSCP values divided into tiers of priority.

In yet another embodiment, a listing of DSCP values includes a hierarchical list of DSCP values sorted by priority. For example, one or more DSCP "thresholds" may be provided to the classifier apparatus and used to divide a hierarchical list of DSCP values. A listing of DSCP values used by the classifier may include all possible DSCP values (0 to 63) or only a certain subset of all DSCP values. The classifier apparatus in this embodiment sorts the data traffic into Low Latency and Normal queues based on one or more DSCP thresholds that can be used to divide a hierarchical list of DSCP values into separate lists.

The DSCP threshold may be adjusted, depending for example on traffic flows and other dynamic variables. For instance, if the classifier apparatus determines that the LL queue is under-used and the Normal queue is congested, the classifier may change the DSCP threshold such that more data packets are reclassified into the LL queue. In another approach, the DSCP threshold may be predetermined for certain scenarios. For example, the DSCP threshold can be set for particular days/dates/times of day, on a premises-specific, user-specific, or device-specific basis, or certain operational conditions within the network, on a slice-specific basis, or yet other approaches. The DSCP threshold can also be set for data packets having particular IP addresses.

In one embodiment, during the Stage 2 re-sorting process, the classifier apparatus/process may apply a first DSCP priority algorithm to data traffic (labeled as LL in FIGS. 2-2B) in Stage 1 and apply a different DSCP priority algorithm to data traffic (labeled as BE) in stage 1.

Figure 2G:
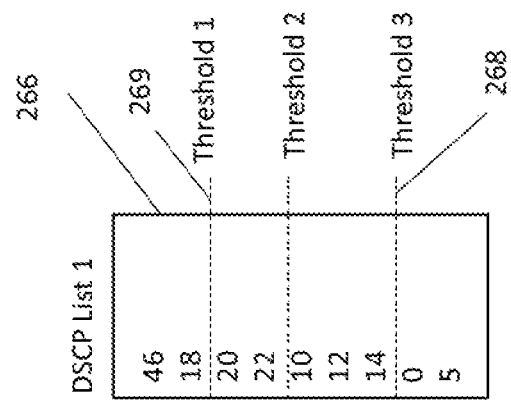
FIG. 2G is an illustration of an exemplary DSCP list useful for sorting data traffic, according to one embodiment of the present invention.

In one exemplary implementation of step 208 of the method(s), the classifier may apply Stage 2 sorting to UL data packets using a hierarchical list of DSCP values (DSCP List 1) as shown in FIG. 2G. The DSCP List 1 266 of FIG. 2G illustrates only a few possible DSCP values, sorted by priority; however, in one variant, all 64 currently specified DSCP values may be included in a hierarchical DSCP listing. In Stage 2 of the sorting process, the classifier apparatus may apply a first DSCP sorting algorithm (e.g., algorithm using Threshold 3 268) to data packets labeled as LL during the Stage 1 process. The classifier may apply a second DSCP sorting algorithm (e.g., algorithm using Threshold 1 269) to data packets labeled as BE during the Stage 1 process. For example, if a previously labeled LL data packet has DSCP value below Threshold 3, it is re-sorted into the Normal queue ($B_{BE}$). Otherwise, the LL data packet retains its LL queue label ($A_{LL}$). On the other hand, if a previously labeled BE data packet has DSCP value above Threshold 1, it is re-sorted into the LL queue ($C_{LL}$). Otherwise, the BE data packet retains its Normal queue label ($D_{BE}$).

Figure 2F:
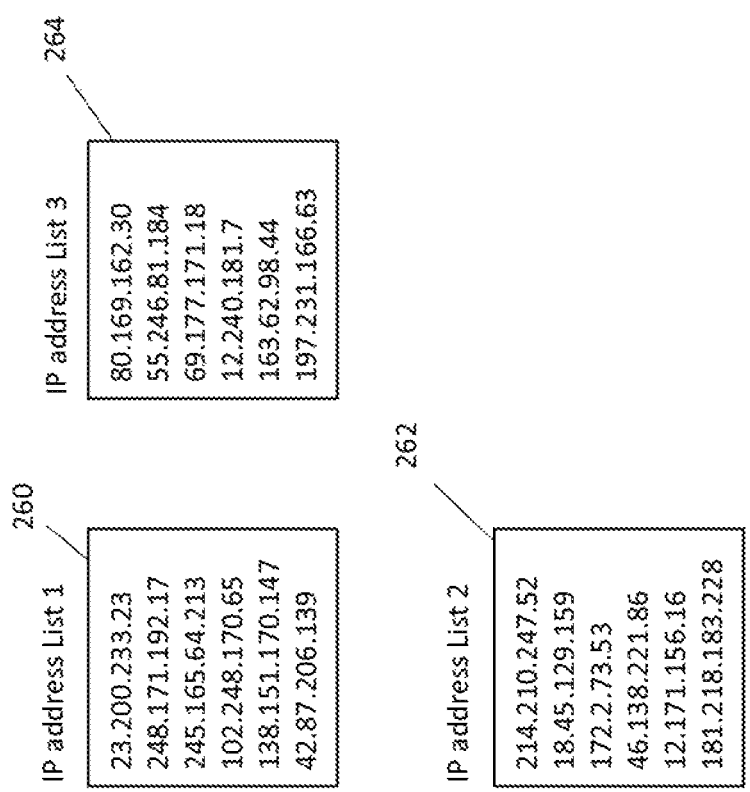
FIG. 2F is a graphical illustration of exemplary IP address lists useful for sorting data traffic, according to one embodiment of the present invention.

Note that the lists of IP addresses and DSCP values in FIGS. 2F and 2G are shown merely to help illustrate the sorting process and are not meant to be realistic.

In steps 210 and 211, the re-sorted data traffic is sent to the Low Latency and Normal queues, respectively, of the DOCSIS 3.1 or 4.0 implemented within a CM or a CMTS. In one embodiment, the data packets scheduled for the Low Latency queue are schedules with a strict priority. In one implementation, as shown in FIG. 2, all the data classified as LL in Stage 1 and kept in LL during Stage 2 (data $A_{LL}$) may have priority over the data classified as Normal/Best Effort in Stage 1 and re-classified to LL during Stage 2 (data $C_{LL}$). In the exemplary methods 220, 240 of FIGS. 2A and 2B, the data packets parsed during Stages 1 and 2 receive strict priority inside the LL queue of:

(i) $AA_{LL}$, then
(ii) $A_{LL}$, and then
(iii) $C_{LL}$.

On the other hand, in various embodiments, the data packets scheduled for the Normal queue may receive weighted priority. For example, as shown in the method of FIG. 2, the Normal queue schedule does not always prioritize either $B_{BE}$ traffic or $D_{BE}$ traffic. The scheduled Normal queue may dynamically change the order of its data packets based on changes in traffic flow and congestion, as previously described.

Finally, in step 212 of the method 200 of FIG. 2, the parsed data traffic is transmitted from the CM or CMTS through the relevant bearer medium (e.g., in an HFC network) using the appropriate Low Latency and Normal queues of the DOCSIS 3.1 or 4.0 standard.

As shown in the alternate approaches of FIGS. 2A and 2B, some of the sorted data traffic (LL and BE) can be transferred to Stage 2 of the classifier, and some of the sorted data traffic ($AA_{LL}$ and/or $DD_{BE}$) fed directly to the Low Latency and Normal queues. In one variant (FIG. 2A), per steps 225, 226 and 227, the classifier may sort the Low Latency traffic into definite Low Latency traffic ($AA_{LL}$) and preliminary Low Latency traffic (LL), and classify the Best Effort traffic into definite Best Effort traffic ($DD_{BE}$) and preliminary Best Effort traffic (BE). In step 226, the classifier may send the $AA_{LL}$ data traffic directly to the LL queue, and in step 227, the classifier may send the DD $B_E$ data traffic directly to the Normal/Best Effort queue. The rest of the sorted data traffic (LL and BE) is fed to the second stage of the classifier (step 228). Per steps 229 and 230, the respective data is sent to the LL and Normal queues, and transmitted per step 232.

In another variant, as shown in FIG. 2B, the classifier apparatus may classify all traffic into three categories: definite Low Latency traffic ($AA_{LL}$), preliminary Low Latency traffic (LL), and all Best Effort traffic (BE). Per step 241, the Stage 1 sort occurs, and in step 242, the classifier sends the $AA_{LL}$ data traffic directly to the LL queue per step 244. The rest of the traffic (LL and BE) is sent to the second stage of the sorting algorithm (step 243). Per step 246, the best efforts ($B_{BE}$ and $D_{BE}$) data is sent to the Normal queue, and data from both queues transmitted per step 228.

In one exemplary implementation of the foregoing methods, a classifier apparatus can apply Stage 1 sorting to UL or DL data traffic using one or more lists of priority IP addresses (e.g., lists as shown in FIG. 2F). For instance, UL traffic can be sorted using destination addresses only, with IP address List 1 260 (FIG. 2F) representing the highest priority IP destination addresses for UL traffic (e.g., a list of high priority MSO network servers). The classifier apparatus in this instance compares data packet IP destination addresses against List 1; if a data packet IP destination address is found in List 1, the data packet is initially labeled as LL traffic, and fed to Stage 2 of the classifier. If a data packet IP destination address is not found in List 1, the data packet is initially labeled as BE traffic and fed to Stage 2 of the classifier. Similarly, in another variant, UL traffic is sorted using destination and source addresses, with List 1 260 representing the highest priority IP destination addresses for UL traffic (e.g., highest priority network servers), and List 2 262 representing the highest priority IP source addresses for UL traffic (e.g., highest priority customers or business partners). If a data packet IP destination address is found in List 1 260 or the data packet IP source address is found in List 2 262, the data packets is initially labeled as LL traffic and fed to Stage 2 of the classifier. If the data packet source and destination addresses are not found in respective priority IP address lists, the data packet is initially labeled as BE and fed to Stage 2 of the classifier. In other variants, UL traffic may be sorted using source addresses only.

In another embodiment, three (3) lists 260, 262, and 264 as shown in FIG. 2F are used. In one variant, UL traffic is sorted using destination addresses only, IP address List 1 262 represents the highest priority IP destination addresses for UL traffic (e.g., a list of high priority MSO network servers), IP address List 2 262 represents the second highest priority IP destination addresses for UL traffic, and IP address List 3 264 represent a lowest priority (or non-prioritized) IP destination addresses for UL traffic. If a data packet IP destination address is found in List 1 260, the data packet is labeled as definite Low Latency ($AA_{LL}$) and fed directly to the LL queue (as seen in step 226). If the data packet IP destination address is found in List 2 262, the data packet is initially labeled as LL traffic and fed to Stage 2 of the classifier. If the data packet IP destination address is found in List 3 264, the data packet is labeled as definite Best Effort traffic ($DD_{BE}$) and fed directly to the Normal queue. If the data packet IP destination address is not found in List 1, List 2, or List 3, the data packet is initially labeled as BE and fed to Stage 2 of the classifier. In other variants, UL traffic may be sorted using both source and destination addresses or using destination addresses only.

Figure 3:
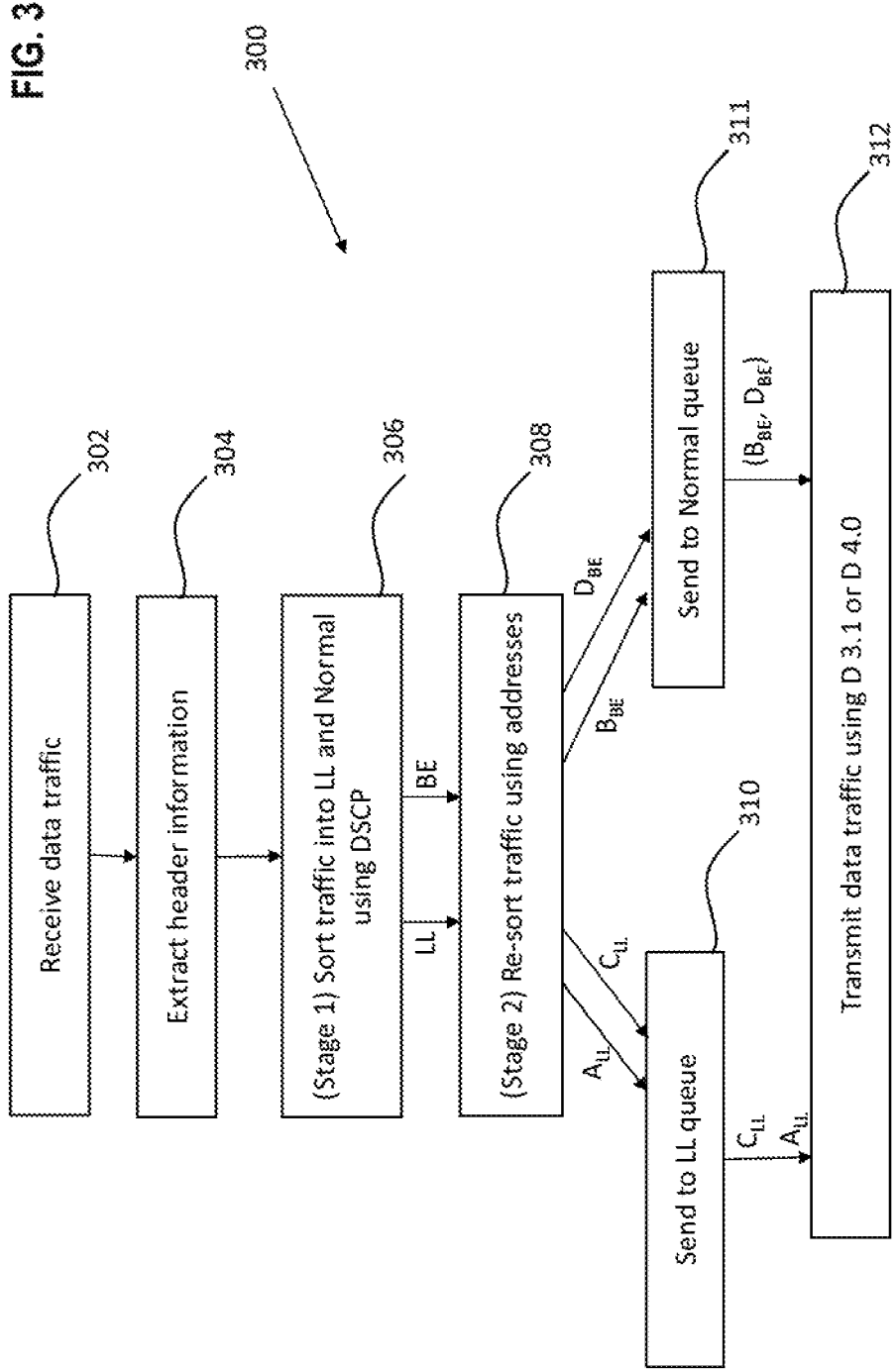
FIG. 3 is a logical flow diagram illustrating an exemplary embodiment of a method for sorting data traffic, according to one embodiment of the present disclosure.

FIG. 3 illustrates another embodiment of a method 300 for classifying data traffic into Low Latency and Normal queues. In this embodiment, the sorting algorithm classifies data traffic using DSCP values during the first stage of the sorting process and reclassifies the data traffic using source/destination addresses during the second stage of the sorting process.

In step 302 of the method 300, data traffic is received by the classifier apparatus.

In step 304, the classifier extracts and reads IP header data, including source/destination IP addresses and DSCP values, from the received PDUs. Steps 302 and 304 can be implemented similarly to steps 202 and 204 of FIG. 2 previously described.

In step 306 of method 300, during Stage 1 of the sorting process, the classifier apparatus uses the extracted DSCP markings to sort the data traffic into Low Latency and Normal queues. In one embodiment, the classifier uses a sorting algorithm to compare DSCP values for upstream and/or downstream traffic to one or more listings of DSCP values.

The listing of DSCP values includes for instance selected DSCP values that should receive a certain priority, according to a previously established or dynamically established determination. In another approach, the listing of DSCP values includes DSCP values divided into tiers of priority. In yet another approach, the listing of DSCP values includes a hierarchical list of DSCP values sorted by priority. One or more DSCP thresholds may be provided to the classifier and used to divide a hierarchical list of DSCP values. The listing of DSCP values used by the classifier may include all possible DSCP values or only certain DSCP values.

The classifier apparatus may also use the DSCP listing to parse the data traffic into Low Latency and Normal queues based on a predetermined DSCP threshold. In one embodiment, the aforementioned hierarchical listing of DSCP values may be different for uplink and downlink data traffic, or identical for both. In another embodiment, the hierarchical listing of DSCP values is identical for both, but the threshold of DSCP priority used by the sorting algorithm is different for UL and DL data traffic.

Referring back to step 306 of FIG. 3, Stage 1 of the sorting algorithm uses DSCP values to parse data traffic into Low Latency (LL) and Normal/Best effort (BE) traffic. The LL and BE traffic is then transferred to Stage 2 of the sorting algorithm. In some embodiments of the disclosure, some of the data traffic output from the Stage 1 process can bypass Stage 2 of the sorting algorithm, and be transferred directly to the Low Latency and Normal queues (in processes similar to FIGS. 2A and 2B).

In step 308, the classifier apparatus uses the extracted source and destination IP addresses to re-sort DSCP-sorted data traffic into Low Latency and Normal traffic queues. In one embodiment, the sorting algorithm of the classifier compares the source and/or destination IP addresses against at least one list of prioritized IP addresses. In one variant, the classifier applies different sorting algorithms and/or different prioritized address lists to UL and DL traffic during the stage 2 re-sorting process, the classifier may also apply a first IP address priority algorithm/list to data traffic labeled as Low Latency in Stage 1 and apply a different IP address priority algorithm/list to data traffic labeled as Normal in Stage 2. Step 308 of the classification method 300 of FIG. 3 can be configured to apply sorting algorithms (as described with respect to step 206 of the classification method of FIG. 2) as well the approaches of FIGS. 2A and 2B.

In step 310 and 311, the re-sorted data traffic is sent to the Low Latency and Normal queues respectively. The data packets scheduled for the Low Latency queue are scheduled with strict priority, and the data packets scheduled for the Normal queue are scheduled with a weighted priority. For example, as shown in FIG. 3, all the data classified as LL in Stage 1 and kept in LL during Stage 2 (data $A_{LL}$) has priority over the data classified as Best Effort in Stage 1 and re-classified to LL during Stage 2 (data $C_{LL}$). Data traffic in the Normal queue ($B_{BE}$ and $D_{BE}$) may be dynamically reclassified, based on e.g., changes in traffic flow and congestion.

Finally, in step 312 of the method 300, the parsed data traffic is transmitted through the cable plant (using CM or CMTS devices) using the appropriate Low Latency and Normal queues compliant with the DOCSIS 3.1 or D 4.0 standard.

Figure 4:
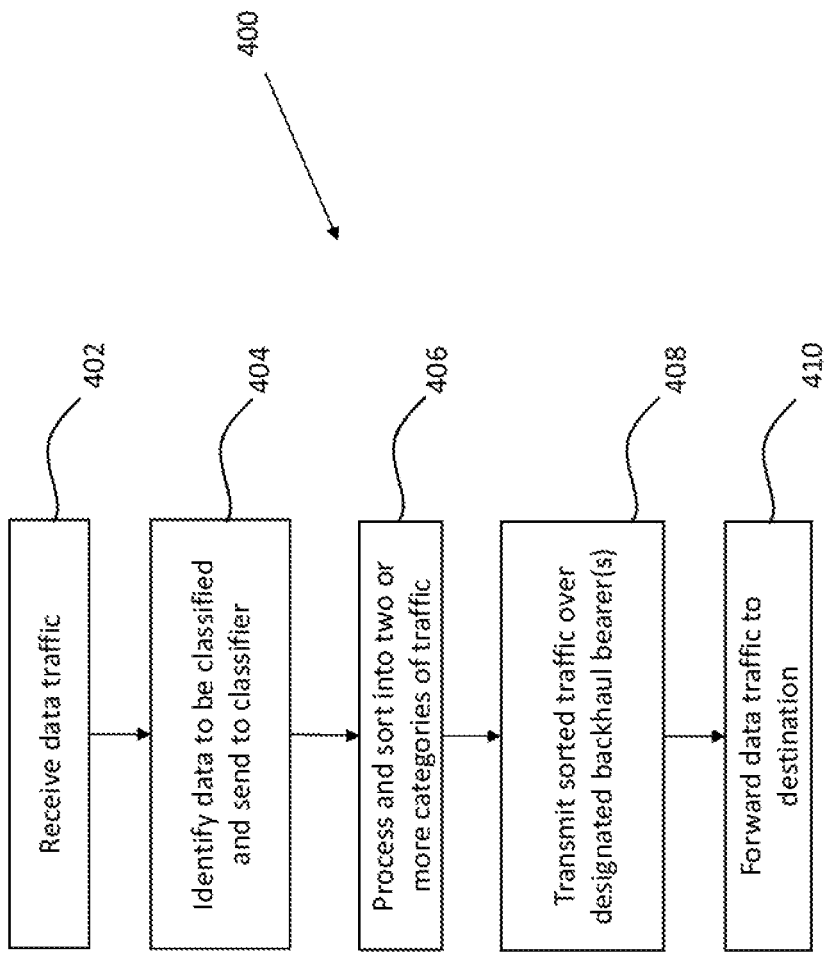
FIG. 4 is a logical flow diagram illustrating an exemplary embodiment of a method for backhauling edge device (e.g., small cell data) traffic, according to the present disclosure.

FIG. 4 illustrates an exemplary method 400 for backhauling data traffic using DOCSIS 3.1 or 4.0 over a cable bearer, in accordance with aspects of the present disclosure. The method of FIG. 4 may be used with any of the exemplary sorting methods described in the present disclosure.

In step 402, a network device receives data traffic in the form of data packets. In one embodiment, the data traffic is 4G/4.5G/5G wireless data traffic is transmitted by a user device and received at an access node (e.g., a small cell or 5G gNB) having a cable modem and connection to an HFC network (operated by an MSO). In another embodiment, the data traffic is transmitted from an MSO network core and received at an HFC network hub having a CMTS. In yet another approach, an MNO-operated small cell generates data that is backhauled by a CM/CMTS of the MSO.

In step 404, the network device may determine that/identify part or all of the data that traffic needs to be transported/backhauled using cable, and send or route the data traffic to a classifier apparatus. In one embodiment, the aforementioned small cell network access node may receive 5G NR data traffic from a user device (e.g., 5G NR UE), and determine that the data traffic needs to be backhauled to the MSO network core. In another embodiment, a network hub receives data traffic from the MSO network core and determines that the data traffic needs to be transported to a wireless access node connected to a user device.

In step 406, the classifier parses or sorts the data traffic into two or more categories or classes using e.g., the methods of FIGS. 2-3. For example, the two categories may be the Low Latency and Normal queues previously described.

In step 408, the parsed data traffic is transported through the selected backhaul medium; e.g., via an HFC cable plant as an RF signal using the appropriate Low Latency and Normal queues of the DOCSIS 3.1 or 4.0 standards.

In step 410, the data traffic is received from the distribution network by a CM (located at e.g., a network access node) or a CMTS (located at a headend or hub of an HFC network), and then forwarded to the appropriate data traffic destination. For example, a CM located at the access node can use a wireless interface of the access node to wirelessly transmit data traffic to a user device. A CMTS located at a network hub can transport data to the network core using an optical ring connection, and to the Internet or an MNO network via e.g., the MSO backbone.

Figure 4A:
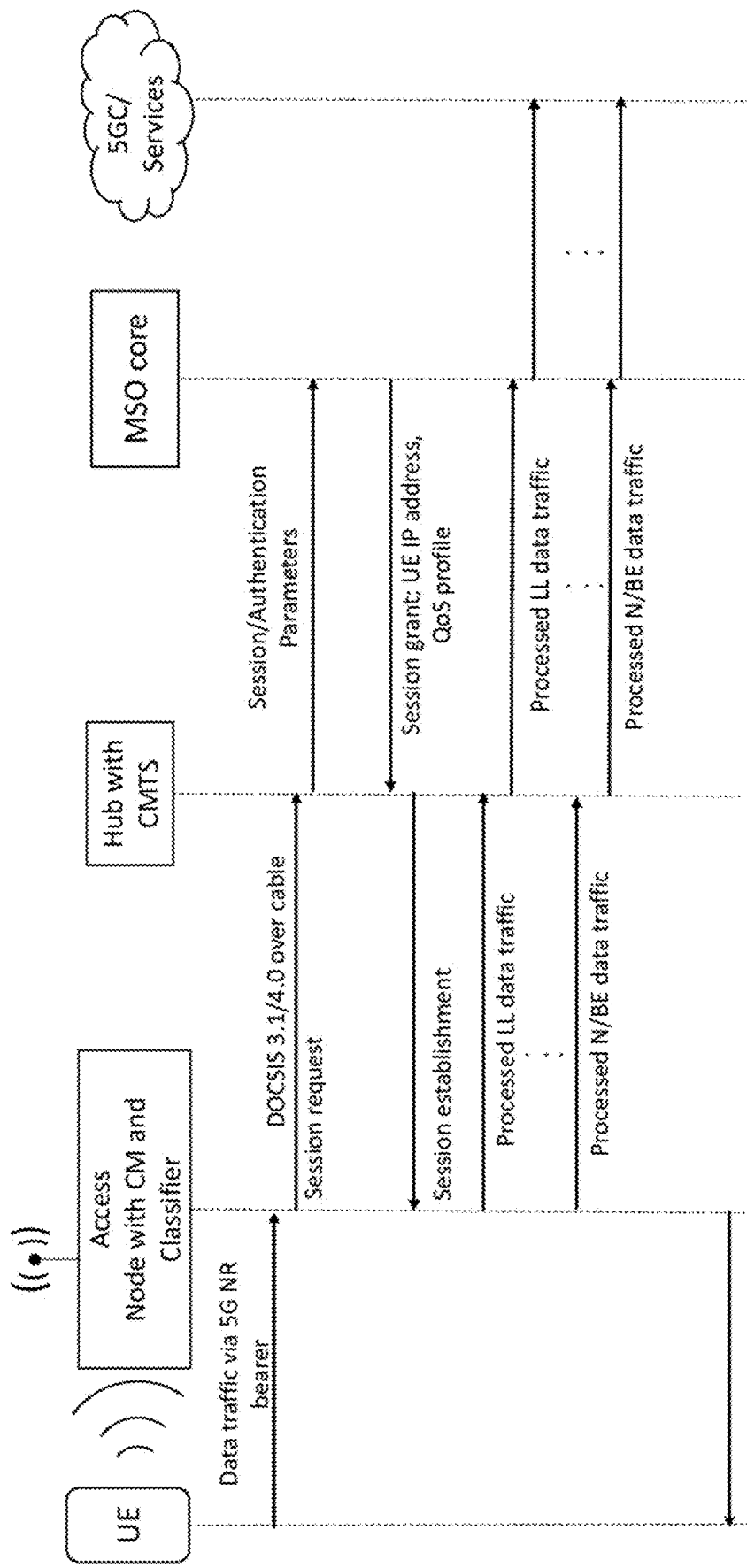
FIG. 4A is an exemplary communication ("ladder") diagram according to one embodiment of the present disclosure.

FIG. 4A is a ladder diagram illustrating exemplary data transmissions, as described in FIG. 4. The data transmissions of FIG. 4A include communications to and from a wireless user device/user equipment (UE) (e.g., a 5G NR enabled connected mobile phone), through a network access node (e.g., gNB or small cell) having a wireline or fiber backhaul to a distribution network (e.g., an HFC network).

In one approach, if the UE does not have an established session, the access node can generate and transmit a session establishment request (e.g., a 5G NR PDU request) to a network core (5GC) located at or connected to an MSO network core using a cable backhaul connection. The session request is transmitted from a CM (located at or near the access node) through an HFC distribution network to a CMTS/M-CMTS/CCAP of the distribution network. The CMTS examines the session request and transfers it to the 5G Core (5GC) functionality located inside the MSO network core. In another embodiment, the 5G Core functionality may be in communication, but located outside of the MSO network core. In response to the session request, the session management function (SMF) within the 5GC establishes a PDU session, assigns IP address and QoS profile to the UE, and sends the IP address and QoS profile to the UE, as shown in FIG. 4A.

If/once the UE has an established data session, the UE may send and receive 4G/4.5G/5G data traffic through the access node, using the same cable backhaul as described above. In one example of upload (UL) data traffic, the UE transmits data packets to the access node, the access node uses a classifier apparatus (CA) to parse the data traffic into Low Latency and Normal queues and transmits the parsed data traffic (using a CM) over DOCSIS 3.1/4.0 using a cable distribution network (e.g., an HFC network) connected to a CMTS, the CMTS forwards the data traffic to an MSO network core/backbone, and the MSO core forwards the data traffic to further services (e.g., Internet, an MNO network, IPTV, etc). In one example of downlink (DL) communication, data traffic is transmitted from servers/services connected to or located at an MSO core to a hub in the network. The data traffic is then sorted by a classifier into Low Latency and Normal queues and transmitted (from a CMTS) through a cable distribution network to a wireless access node. The access node then wirelessly transmits the data packets to a user device/equipment (UE).

Figure 4B:
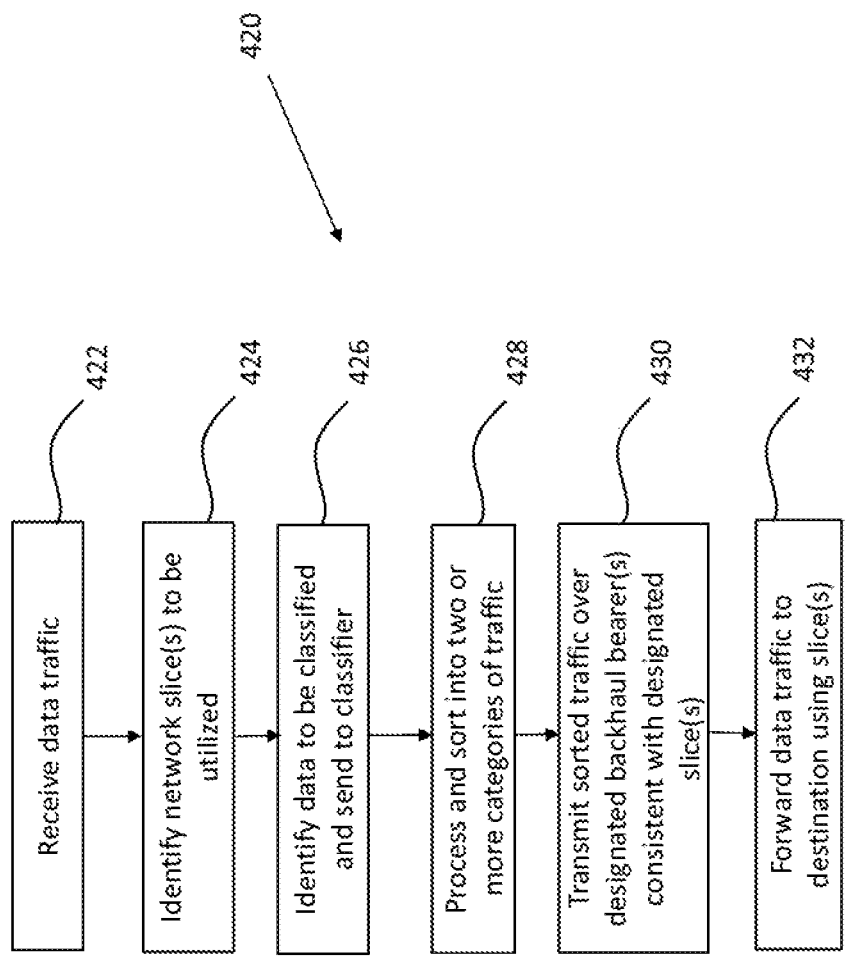
FIG. 4B illustrates another exemplary method for backhauling data traffic using DOCSIS 3.1 or 4.0 over a cable bearer, in accordance with aspects of the present disclosure.

FIG. 4B illustrates another exemplary method 420 for backhauling data traffic using DOCSIS 3.1 or 4.0 over a cable bearer, in accordance with aspects of the present disclosure. The method of FIG. 4B may also be used with any of the exemplary sorting methods described in the present disclosure.

In step 422, a network device receives data traffic in the form of data packets. In one embodiment, the data traffic is 4G/4.5G/5G wireless data traffic is transmitted by a user device and received at an access node (e.g., a small cell or 5G gNB) having a cable modem and connection to an HFC network (operated by an MSO).

In step 424, one or more 5G NR network slices that are to be utilized by the UE-anchored traffic are identified, such as via SST or other mechanisms previously described herein.

At step 426, the network device may then determine that/identify part or all of the data that traffic needs to be transported/backhauled using cable, and send or route the data traffic to a classifier apparatus. Note that not all backhauled data may need to be classified; for instance, some data may be marked for different routing, or be intended for local consumption by the receiving node. Since a UE can sustain up to eight (8) different slices, the determination of step 426 may be conducted on a per-slice basis as well. As such, the classifier apparatus can be thought of as a virtual parallel slice classification processor.

In step 428, the classifier processes/sorts the data traffic into e.g., two or more categories or classes using e.g., the methods of FIGS. 2-3. For example, the two categories may be the Low Latency and Normal queues previously described. Again, such processing/sorting may be on a per-slice basis if desired.

In step 430, the parsed data traffic is transported through the selected backhaul medium; e.g., via an HFC cable plant as an RF signal using the appropriate Low Latency and Normal queues of the DOCSIS 3.1 or 4.0 standards.

In step 432, the data traffic is received from the distribution network by a CM (located at e.g., a network access node) or a CMTS (located at a headend or hub of an HFC network), and then forwarded to the appropriate data traffic destination via the appropriate slice(s). Some or all of the network slice function/apparatus allocation may be performed by the MSO core, and/or the MNO (e.g., within the 5GC or other entity). As such, the MSO may "own" part of each slice, and hence coordination between MNO and MSO is contemplated for at least such purposes (i.e., setting up an end-to-end or partial slice in support of certain classes of traffic).

Network Architecture—

Figure 5:
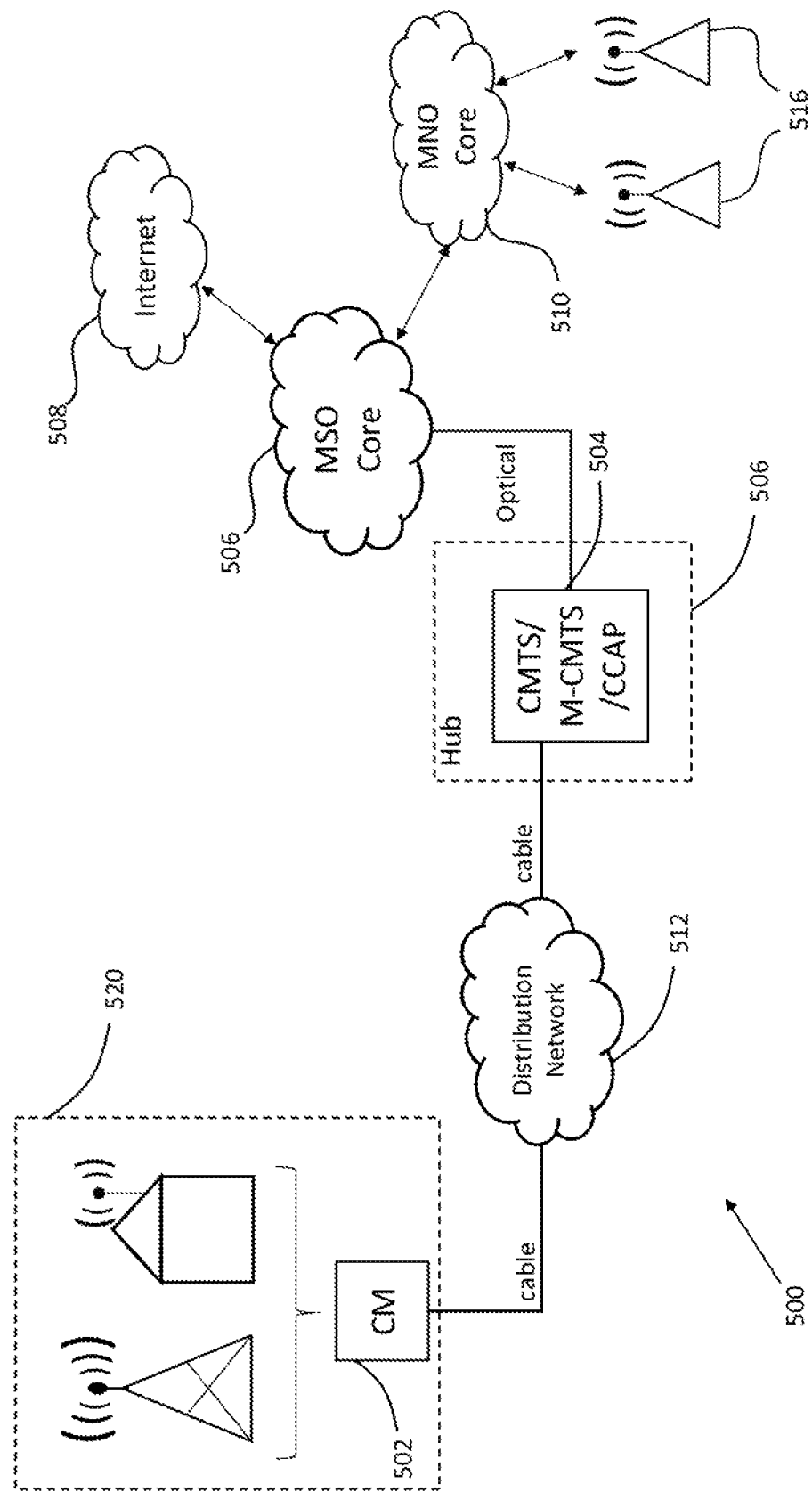
FIG. 5 is a functional block diagram of an exemplary network architecture comprising various features of the present disclosure.

FIG. 5 illustrates an exemplary network architecture 500 having a distribution network 512 (e.g., an HFC network) useful for backhauling small cell data traffic or other data traffic. A cable modem (CM) 502 may be located at and/or be connected to a wireless access node 520 (e.g., 4G/4.5G/ 5G enabled radio access node). The access node 520 may be located at customer or business premises, along the side of a road, etc., and may be pole mounted, surface mounted, buried, and/or co-located with other MSO equipment. It may also be an MNO-operated gNB or similar which is backhauled by e.g., the MSO CM 502 or similar. The CM 502 is connected through a physical cable to the distribution network 512. Data communications from the access node 520 may be transmitted (backhauled) over DOCSIS 3.1/4.0 using cable infrastructure of the distribution network 512 to, e.g., a cable modem termination system (CMTS) 504 of the HFC network of a CCAP-compliant entity, depending on architecture (e.g., as an MHA or M-CMTS or converged/ unified CCAP). The CMTS/M-CMTS/CCAP 504, located at a headend or hub 506 of the HFC network, is connected to the MSO network core/backbone 506. The MSO network core 506 may include or be connected to various MSO services, 4G/4.5G/5G Core functionality (e.g., 5GC), the Internet 508, and various MNO networks 510. The MNO networks 510 are connected to their own radio/access nodes 516 that provide cell or other services to users.

Figure 6:
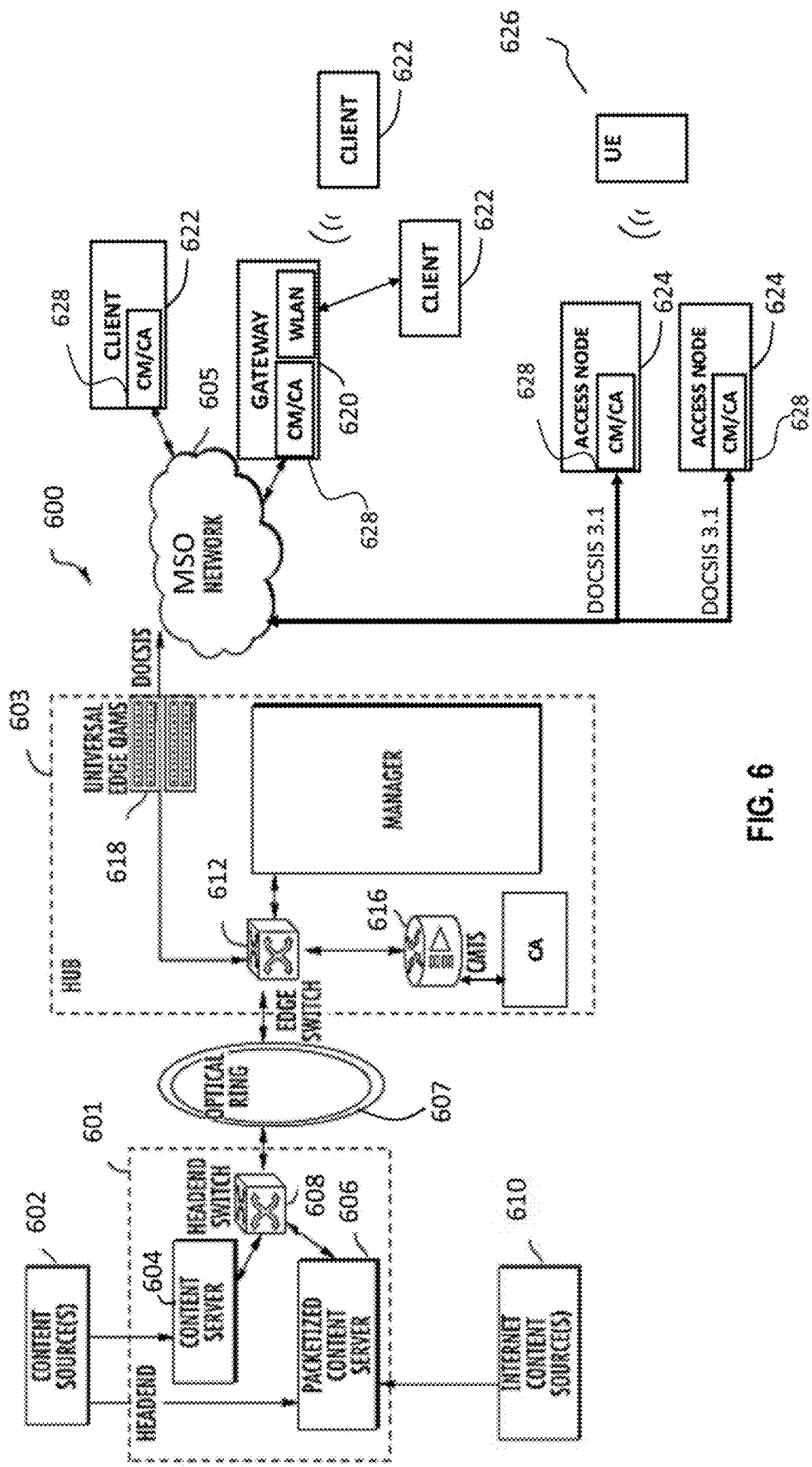
FIG. 6 is a functional block diagram of an exemplary MSO network architecture useful in conjunction with various features described herein.

FIG. 6 illustrates a typical service provider network configuration which may comprise part of the cable backhaul network architecture 500 described herein.

In one embodiment, this service provider network 600 may provide backbone and backhaul functions from various network nodes, including the service provider's own network nodes and network nodes belonging to complementary network architectures (e.g. small cell network nodes), to other network nodes, premises, or users/subscribers. The service provider network 600 may also provide delivery of linear and other types of content to network users or subscribers.

The MSO network architecture 600 of FIG. 6 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 6 may deliver Internet data and OTT (over-the-top) services to the end users via the Internet protocol (IP) and TCP (i.e., over the DOCSIS or in-band QAM bearer), although other protocols and transport mechanisms of the type well known in the digital communication art may be substituted.

The network architecture 600 of FIG. 6 generally includes one or more headends 601 in communication with at least one hub 603 via an optical ring 607. The distribution hub 603 is able to provide content to various "client" devices 622 (which may include CPE such as DSTBs or the like), and gateway devices 620 as applicable, via an interposed network infrastructure 605. The gateway device 620 and some of the client devices 622 are connected to the network infrastructure through cable modem (CM) devices 628, the latter which in one embodiment include the classifier apparatus (CA) as shown. Moreover, as required, the CMTS/M-CMTS/CCAP 616 of the MSO network 600 may include a CA as shown. In one variant, some of the functionality of an integrated or single CA as previously described herein with respect to the methods of FIGS. 2-3 may be distributed across the different "local" and "network" CA components, or in another approach each CA only handles one direction of routing (i.e., UP for the CM, and DL for the CMTS/M-CMTS-CCAP).

In the MSO network 600 of FIG. 6, various content sources 602 are used to provide content to content servers 604. Content may be received from a local, regional, or network content library, from linear analog or digital feeds, as well as third party content sources. Internet content sources 610 (such as e.g., a web server) provide Internet content to a packetized content origin server(s) 606. Other IP content (such as voice over IP (VoIP) and/or IPTV content) may also be received from subscriber and non-subscriber devices (e.g., a PC or smartphone-originated user made video).

The network architecture 600 of FIG. 6 may further include a legacy multiplexer/encrypter/modulator (MEM; not shown). The content server 604 and packetized content server 606 may be coupled via a LAN to a headend switching device 608 such as an 802.3z Gigabit Ethernet (or "10G") device. For downstream delivery via the MSO infrastructure (i.e., QAMs), video and audio content is multiplexed at the headend 601 and transmitted to the edge switch device 612 (which may also comprise an 802.3z Gigabit Ethernet device) via the optical ring 607.

In one exemplary content delivery paradigm, MPEG-based video content (e.g., MPEG-2, H.264/AVC or H.265/HEVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). Delivery in such packetized modes may be unicast, multicast, or broadcast.

In aspect of the present invention, IP packets associated with a small cell are received by small cell access nodes 624, processed, backhauled (from CMs 628) to the MSO network 605 (e.g., the HFC distribution network) using DOCSIS 3.1/4.0 over cable, and forwarded to a network hub 603, including a cable modem termination system (CMTS), M-CMTS or CCAP 616 of the MSO network. The CMTS 616 examines the packets, and forwards packets intended for the local network to the edge switch. Other packets are in one variant discarded or routed to another component. The edge switch 612 forwards the packets receive from the CMTS 616 to the optical ring 607 or to the QAM modulator, which transmits the packets on one or more physical (QAM-modulated RF) channels (through the client CMs 628) to the CPE devices 620, 622. The IP packets are typically transmitted on RF channels that are different than the "in band" RF channels used for the broadcast video and audio programming, although this is not a requirement.

Exemplary Network Access Node—

Figure 7:
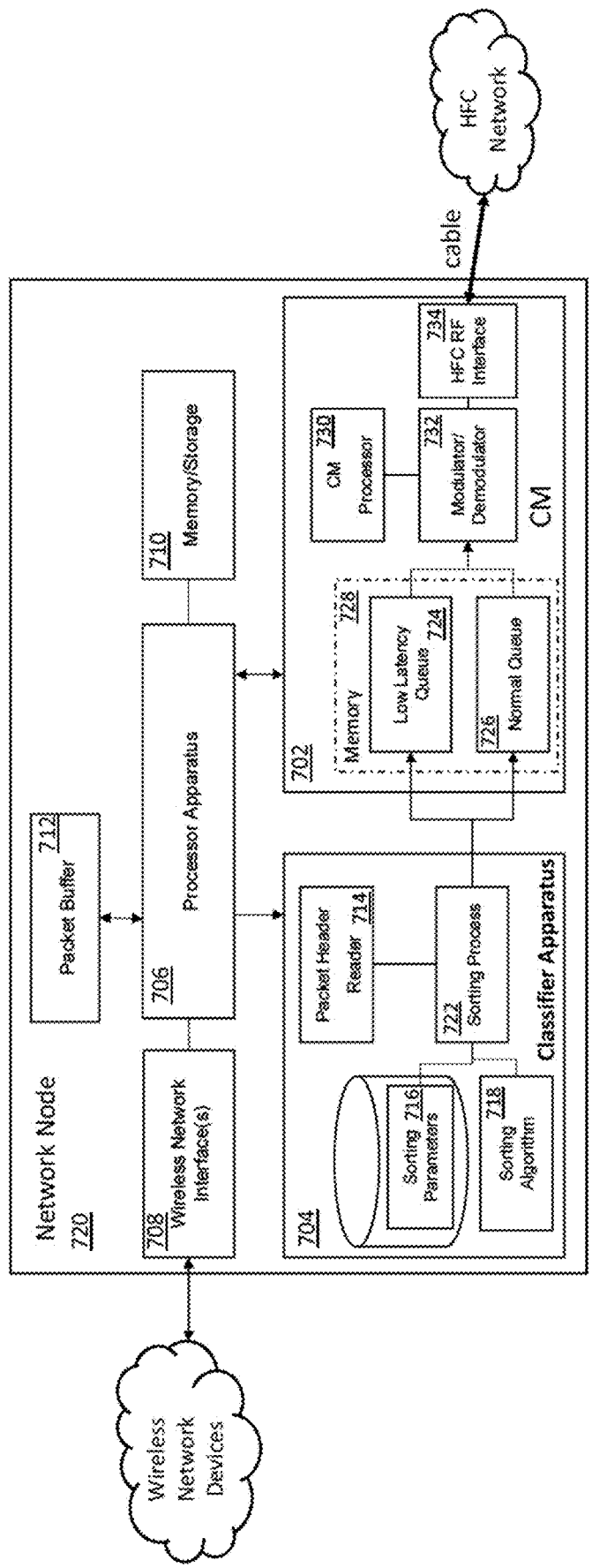
FIG. 7 is a functional block diagram illustrating an exemplary configuration of a network access node, according to one embodiment of the present disclosure.

FIG. 7 is a block diagram illustrating an exemplary configuration of a network access node 720 having a cable backhaul connection, useful for operation in accordance with the present disclosure. In one embodiment, the network node may be, may be part of, or be connected to a small cell of a wireless network (e.g., 4G, 4.5G, 5G network) For instance, the access node may be a 3GPP 5G NR-compliant node, a CBRS CBSD, femtocell, or other such node. The network access node 720 of FIG. 7 may be used in the network architectures of FIGS. 5 and 6.

The network node may include a processor apparatus or subsystem 706, a memory module 710, and a wireless network interface 708 (including e.g., an antenna apparatus) for communicating with wireless network devices such as UE, CBRS FWA, etc. In one embodiment, the processor apparatus 706 may include one or more of a digital signal processor, microprocessor, field-programmable gate array, or plurality of processing components mounted on one or more substrates. The processor 706 may also comprise an internal cache memory. In one embodiment, the processing apparatus 706 is configured to execute at least one computer program stored in the memory module 710 to support data classifier functionality and other network node functionality. Other embodiments may implement such functionality within dedicated hardware, logic, and/or specialized co-processors (not shown).

The processor apparatus may be connected to the data traffic classifier apparatus (CA) 704 and a cable modem (CM) 702. The classifier includes a number of functional modules, implemented as software or firmware, including a packet header reader 714 and a sorting process 722. The distinct functional modules 714,722 of the classifier may comprise their own hardware/software environment, and/or be distributed across multiple logical domains. The sorting process 722 may be in logical communication with sorting parameters 716 and a sorting algorithm 718, which may be stored locally on the classifier apparatus (e.g., within a local database as shown), supplied from another part of the network node, or supplied from a remote location (e.g., from wireless network or HFC network). The sorting process 722 may implement a data sorting method according to one embodiment of the present disclosure, including sorting methods of FIGS. 1-3. In some variants, the packet buffer 712 and/or memory module 710 of the network node may at least temporarily store the received packets (e.g., as a FIFO or LIFO buffer depending on packet type) for analysis by the classifier apparatus. The CA 704, as described above, and various functions thereof may additionally be implemented in other portions of an HFC network. For example, a CMTS/M-CMTS/CCAP of an MSO network may include or be connected to a classifier device or classifier functions (e.g., sorting process) in order to properly forward data traffic to client devices (through the HFC network) as previously shown in FIG. 6.

The cable modem 702 (CM) may be provided locally at the network access node 720 and may be wirelessly and/or wireline connected to the CA 704, the process apparatus of the network node, and other entities of the network node. The CM 702 includes a CM processor 730, a memory 728, a modulator/demodulator 732, and a cable (e.g., HFC) interface 734 which may be used to transmit and receive data through an HFC network. The CM memory 728 may be used to store/buffer the data packets sorted by the classifier into Low Latency queue 724 and Normal queue 726. In the exemplary embodiment, the CA 704 is separated from the CM 702. In a second embodiment, the classifier may be integrated as a part of the CM. In yet another embodiment, at least some of the functionality of the classifier may be alternatively installed, virtualized, and/or distributed within other network entities.

In the exemplary embodiment, the network node 720 is configured to receive data via the wireless network interface (s) 708 from, e.g., a client device, use the CA 704 to evaluate and sort the packets making up the data traffic, and use the CM 702 to transmit the data traffic over HFC cable using QoS support of DOCSIS 3.1 or D 4.0 standards (i.e., sorting into LL and Normal queues of DOCSIS 3.1).

In one example, as discussed elsewhere herein, the CA 704 is configured to read data associated with at least one packet of the received traffic. In one embodiment, the packet/header reader 714 may be configured to read and/or extract the destination IP address, the source IP address, and the DSCP value(s) of a given packet from an IP header an IP outer header of the data packet. The data traffic may include e.g., 5G NR compliant GTP-U encapsulated data packets and the DSCP values of the data traffic are based on QoS Flow ID (QFI) of the data packets.

The sorting process 722 is configured to use the sorting algorithm 718 to compare the extracted IP source/destination addresses and the DSCP values to the sorting parameters 716. As previously described, the sorting parameters can include e.g., at least one listing of IP source and/or destination addresses that should be prioritized by the CA; such listings may also be maintained within the local database, or be network-based (e.g., within the MSO cloud or headend). In one embodiment, the sorting parameters include at least one listing of DSCP values, sorted by priority, and at least one DSCP threshold.

Figure 8:
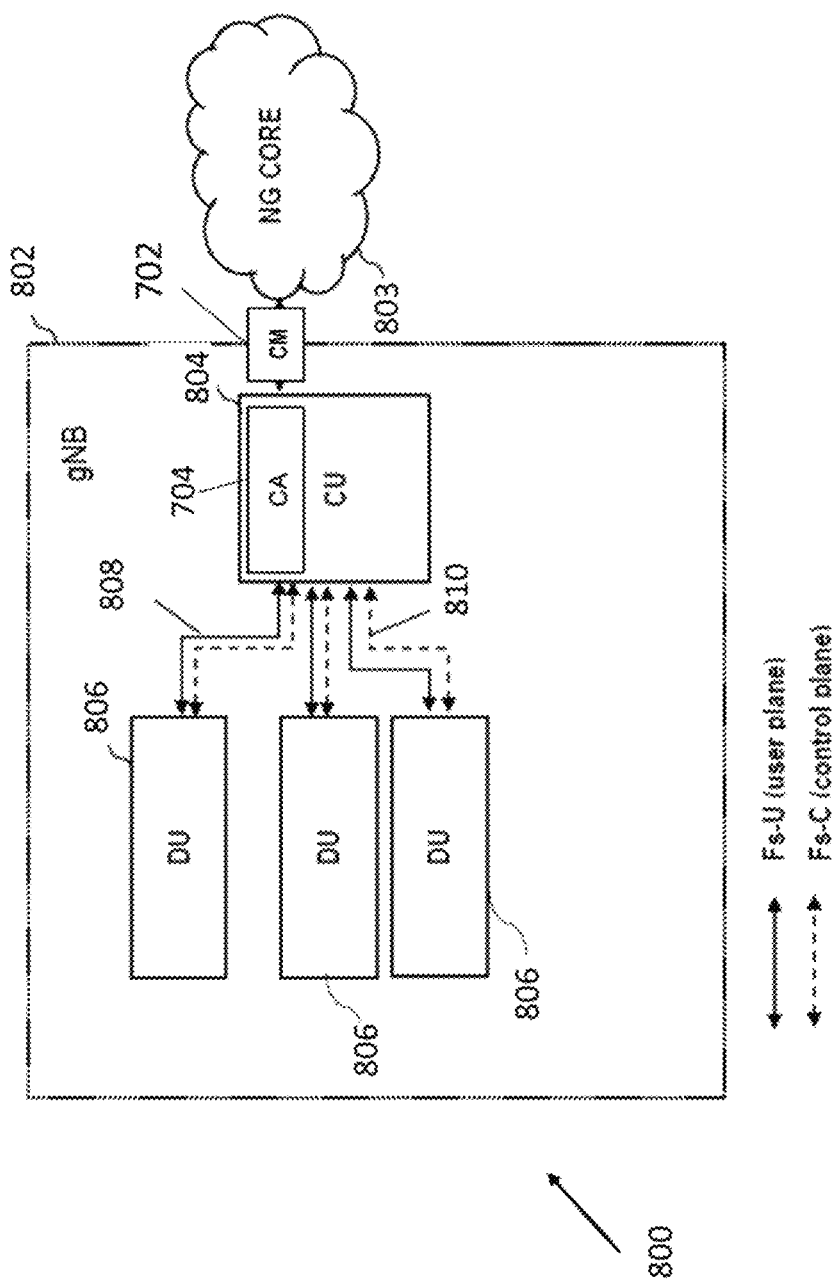
FIG. 8 is a functional block diagram of one embodiment of a gNB architecture including CU with classifier apparatus and multiple DUs.

FIG. 8 illustrates another exemplary embodiment of the enhanced access node according to the present disclosure. In this embodiment, a 5G NR gNB is used as the access node and includes a CM 702 and CA 704 as in the embodiment of FIG. 7. In one variant, the CA 704 is disposed within the CU 804 of the gNB. As a brief aside, the CU 804 (also known as gNB-CU) is a logical node within the NR architecture that communicates with the NG Core 803, and includes gNB functions such as transfer of user data, session management, mobility control, RAN sharing, and positioning; however, other functions are allocated exclusively to the DU(s) 806 (also known as gNB-DUs) per various "split" options. The CU 804 communicates user data and controls the operation of the DU(s) 806, via corresponding front-haul (Fs) user plane and control plane interfaces 808, 810.

In another variant, the CA 704 may be disposed completely or in part within a DU 806 of the gNB. For example, where only a certain one or type of DU would be operative to receive low-latency data or handle certain types of UE slice "requests," the CA may be allocated to that DU alone.

Note that the functions of the CA 704, including its individual stages as previously described, may be allocated across two or more entities, whether within the gNB 802 illustrated or otherwise. Moreover, heterogeneous stage embodiments are envisioned (whether for the gNB or other types of devices), such as where a common second stage (e.g., Stage 2 described above) is allocated to the CU 804, and different types of Stage 1 processing are performed at e.g., two or more of the DU 806. For example, a certain DU or type of DU may benefit most from using one form of sorting within the first stage, whereas another might benefit more from another type.

Conversely, the Stage 2 (or subsequent, if any) processing or sorting may be made heterogeneous with respect to a common Stage 1 process. For example, the CU/CA may apply one or more dynamically selected Stage 2 algorithms based on which DU is sending it packet data.

Within such an architecture 800, a gNB-DU 806 (or ngeNB-DU) is under the control of a single gNB-CU 804. When a gNB-DU is initiated (including power-up), it executes an F1 SETUP procedure (which is generally modeled after the S1 SETUP procedures of LTE) to inform the controlling gNB-CU of, inter alia, any number of parameters such as e.g., the number of cells (together with the identity of each particular cell) in the F1 SETUP REQUEST message. These messages are in one variant modified (e.g., via their relevant Information Element or IE) to include data relating to: (i) requested or served slices per UE, (ii) IP header, DSCP, or QFI data for packets received, which can be utilized by the CU/CA in configuring the appropriate sorting algorithms It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized apparatus configured for classifying packetized data traffic, the computerized apparatus comprising:

a digital processing apparatus;
one or more network interfaces in communication with the digital processing apparatus; and
a storage device in communication with the digital processing apparatus and having at least one computer program disposed thereon in the form of a plurality of instructions configured to, when executed on the digital processing apparatus:
receive a plurality of data packets issued from a user device;
access first data from the plurality of data packets indicative of at least one destination network address;
access second data from the plurality of data packets indicative of at least one QoS management parameter;
based at least on the accessed first data, cause a first sorting of the received plurality of data packets into either low-latency traffic or best-effort traffic;
based at least on the accessed second data, subsequent to the first sorting, cause a re-sorting of the received plurality of data packets; and
in accordance with the re-sorting, utilize one or more of a low-latency bearer or a best-efforts bearer each configured for carrying respective ones of the plurality of data packets from the computerized apparatus to the at least one destination network address.

2. The computerized apparatus of claim 1, wherein the first data comprises a destination IP address for upstream IP packets, and the second data comprises DSCP (differentiated services code point) data.

3. The computerized apparatus of claim 2, wherein the DSCP (differentiated services code point) data comprises DSCP data obtained via an S1 interface, and the computerized apparatus comprises a 3GPP Long Term Evolution (LTE) femtocell or node.

4. The computerized apparatus of claim 2, wherein the DSCP (differentiated services code point) data comprises DSCP data obtained via an N3 interface, and the computerized apparatus comprises a 3GPP 5G NR (New Radio) compliant gNB or wireless node.

5. The computerized apparatus of claim 4, wherein the plurality of instructions are further configured to, when executed on the digital processing apparatus, utilize third data within the plurality of data packets, the third data comprising QFI (QoS Flow Identification) data found in one or more encapsulation headers of the plurality of data packets.

6. The computerized apparatus of claim 4, wherein the plurality of instructions are further configured to, when executed on the digital processing apparatus, utilize fourth data, the fourth data comprising data relating to available bandwidth on a data network in communication with the computerized apparatus used for carrying the plurality of data packets.

7. The computerized apparatus of claim 6, wherein the utilization of the fourth data comprises adjusting at least one sorting algorithm used for the utilization of either the low-latency bearer or the best-efforts bearer.

8. A computerized method of parsing packetized data traffic, the computerized method comprising:
receiving a plurality of data packets;
obtaining first parameters of the data packets;
obtaining second parameters of the data packets;
performing a first evaluation of the plurality of data packets using the first parameters;
based on the first evaluation, assigning a first classification to first ones of the plurality of data packets and assigning a second classification to second ones of plurality of data packets;
performing a second evaluation of the plurality of data packets using the second parameters;
based on the second evaluation, assigning a third classification to at least some of the first ones of the plurality of data packets assigned the first classification, maintaining the first classification to any remaining of the first ones of the plurality of data packets assigned the first classification, assigning a fourth classification to at least some of the second ones of the plurality of data packets assigned the second classification, and maintaining the second classification to any remaining of the second ones of the plurality of data packets assigned the second classification;
sending data packets assigned the first classification and data packets assigned the fourth classification to a first queue; and
sending data packets assigned the second classification and data packets assigned the third classification to a second queue.

9. The computerized method of claim 8, further comprising extracting Internet Protocol (IP) headers from the plurality of data packets; and
wherein the obtaining the first parameters comprises reading IP addresses from the IP headers.

10. The computerized method of claim 9, wherein:
the plurality of data packets comprises upstream data traffic;
reading the IP addresses comprises reading only destination IP addresses of the plurality of data packets; and
the performing the first evaluation comprises comparing the destination IP addresses against one or more lists of priority IP addresses.

11. The computerized method of claim 9, wherein:
the plurality of data packets comprises downstream data traffic;
the reading the IP addresses comprises reading only source IP addresses of the plurality of data packets; and
the performing the first evaluation comprises comparing the source IP addresses against one or more lists of priority IP addresses.

12. The computerized method of claim 8, further comprising extracting Internet Protocol (IP) headers from the plurality of data packets; and
wherein the obtaining the second parameters comprises obtaining differentiated services code point (DSCP) values from the IP headers.

13. The computerized method of claim 12, wherein the IP headers comprise at least one IPv6 address associated with a high-priority data traffic network destination.

14. The computerized method of claim 8, further comprising obtaining third parameters of the data packets, the third parameters comprising QFI (QoS Flow Identification) data, the QFI data utilized in assigning of at least of said first classification, second classification, or third classification.

15. A computerized apparatus configured for classifying packetized data traffic, the computerized apparatus comprising:
a digital processing apparatus;
one or more network interfaces in communication with the digital processing apparatus; and
a storage device in communication with the digital processing apparatus and having at least one computer program disposed thereon in the form of a plurality of instructions configured to, when executed on the digital processing apparatus, cause the computerized apparatus to:
receive a plurality of data packets;
determine whether the data packets comprise upstream or downstream data traffic;
based on a determination that the data packets comprise upstream data traffic, apply a first sorting algorithm; and
based on a determination that the data packets comprise downstream data traffic, apply a second sorting algorithm different from the first sorting algorithm.

16. The computerized apparatus of claim 15, wherein the application of the first sorting algorithm and the application of the second sorting algorithm are each based at least on one or more differentiated services code point (DSCP) values obtained from the received plurality of data packets.

17. The computerized apparatus of claim 16, wherein:
the plurality of instructions are further configured to, when executed on the digital processing apparatus, cause the computerized apparatus to determine a plurality of priority levels associated with the one or more DSCP values, and performance of an evaluation of the plurality of priority levels; and
the application of the first sorting algorithm and the application of the second sorting algorithm are each further based on determination of respective priority levels associated with the received plurality of data packets.

18. The computerized apparatus of claim 15, wherein:
the determination that the data packets comprise upstream data traffic comprises a determination of one or more destination network addresses detected within the received plurality of data packets; and
the determination that the data packets comprise downstream data traffic a determination of one or more source network addresses detected within the received plurality of data packets.

19. The computerized apparatus of claim 15, wherein the first sorting algorithm comprises an assignment of at least a portion of the plurality of data packets into a low-latency data transmission queue and at least another portion of the plurality of data packets into a best-effort data transmission queue.

20. The computerized apparatus of claim 19, wherein the second sorting algorithm comprises, subsequent to performance of the first sorting algorithm, an assignment of at least a portion of the plurality of data packets into another low-latency data transmission queue and at least another portion of the plurality of data packets into another best-effort data transmission queue.

* * * * *